(12) United States Patent
Nagata

(10) Patent No.: US 6,250,901 B1
(45) Date of Patent: Jun. 26, 2001

(54) SEGMENTED MOLD FOR PNEUMATIC TIRES

(75) Inventor: Masami Nagata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/266,838

(22) Filed: Mar. 12, 1999

(30) Foreign Application Priority Data

Mar. 12, 1998 (JP) .................................................. 10-061154
Feb. 9, 1999 (JP) .................................................. 11-031124

(51) Int. Cl.$^7$ .................................................. B29C 35/02
(52) U.S. Cl. .................................................. 425/46; 425/47
(58) Field of Search .................................... 425/46, 47

(56) References Cited

U.S. PATENT DOCUMENTS 4,883,415   11/1989   Salvadori .
5,234,326 * 8/1993   Galli et al. ............................. 425/46

FOREIGN PATENT DOCUMENTS 24 20 404   11/1975   (DE) .

\* cited by examiner

Primary Examiner—James P. Mackey
(74) Attorney, Agent, or Firm—Oliff & Berridge, PLC

(57) ABSTRACT

A segmented mold for pneumatic tires includes a plurality of segmented tread mold pieces for forming an outer contour of a tire tread portion, a plurality of connector segments detachably connected to outer peripheral surfaces of the respective tread mold pieces, and a container ring slidably engaged with tapered portions of the connector segments such that an axial movement of the container ring causes radial movement of each tread mold piece. The connector segments are detachably connected with the respective tread mold pieces, by locking engagement of first latch members of the connector segments with second latch members of the tread mold pieces. A relative movement between the first and second latch members is caused by an actuating mechanisms so that the first and second latch members are engaged with each other upon relative movement of the first and second latch members in a predetermined direction thereby connecting the connector segments to the tread mold pieces, and the first and second latch members are disengaged from each other upon relative movement of the first and second latch members in an opposite direction thereby disconnecting the connector segments from the tread mold pieces.

13 Claims, 37 Drawing Sheets

SEGMENTED MOLD FOR PNEUMATIC TIRES

BACKGROUND OF THE INVENTION

1. Field of the Invention

The present invention relates to a vulcanizing mold for pneumatic tires and, in particular, to a segmented mold including a plurality of tread mold pieces which are disposed in annular arrangement.

2. Description of the Related Art

In the tire industry, segmented molds are widely used for manufacturing pneumatic tires, in particular high performance radial tires. In order to achieve a satisfactory manufacturing productivity of tires, however, known segmented mold requires further improvement. Specifically, besides a complicated structure arising from a large number of associated components and a high initial cost, there is a serious a problem that substantial labor and time are required for manually assembling or disassembling the mold when, for example, changeover is to be effected in respect of size or specification of tires to be manufactured. Moreover, because the assembly or disassembly of the segmented mold is manually carried out within the vulcanizing machine, it is often necessary to wait the required operations until the vulcanizing machine has been sufficiently cooled down, which involves considerable loss time and waste of the heat energy which had been supplied to the vulcanizing machine and used for previous vulcanizing steps.

DISCLOSURE OF THE INVENTION

It is therefore a primary object of the present invention to provide an improved segmented mold which is essentially free from the above-mentioned drawbacks.

Another object of the present invention is to provide an improved segmented mold which can be assembled or disassembled within a significantly reduced time, making it possible to perform the changeover in size or specification of the tires to be produced by the vulcanizing machine and thereby achieving a marked improvement in the manufacturing productivity.

Still another object of the present invention is to provide an improved segmented mold in which the components of the mold are positioned and centered with respect to each other in a positive and facilitated manner, so as to allow production of high performance tires with an improved quality in terms of dimensional accuracy.

These and other objects and functions are advantageously achieved by the segmented mold according to the present invention, which includes a plurality of segmented tread mold pieces for forming an outer contour of a tire tread portion, a plurality of connector segments detachably connected to outer peripheral surfaces of the respective tread mold pieces, and a container ring having a tapered surface which is slidably engaged with tapered portions of the connector segments such that an axial movement of the container ring causes radial movement of each tread mold piece.

The novel and unique features of the present invention reside in that the connector segments are detachably connected to the respective tread mold pieces, by engagement of first latch members of the connector segments with corresponding second latch members of the tread mold pieces. Furthermore, an actuating means serve to cause a relative movement between the first and second latch members so that the first and second latch members are engaged with each other upon relative movement of the first and second latch members in a predetermined direction thereby connecting the connector segments to the tread mold pieces, and the first and second latch members are disengaged from each other upon relative movement of the first and second latch members in an opposite direction thereby disconnecting the connector segments from the tread mold pieces.

BRIEF DESCRIPTION OF THE DRAWINGS

The present invention will be more fully described below with reference to the accompanying drawings, in which.

DESCRIPTION OF THE PREFERRED EMBODIMENTS

Figure 1A:
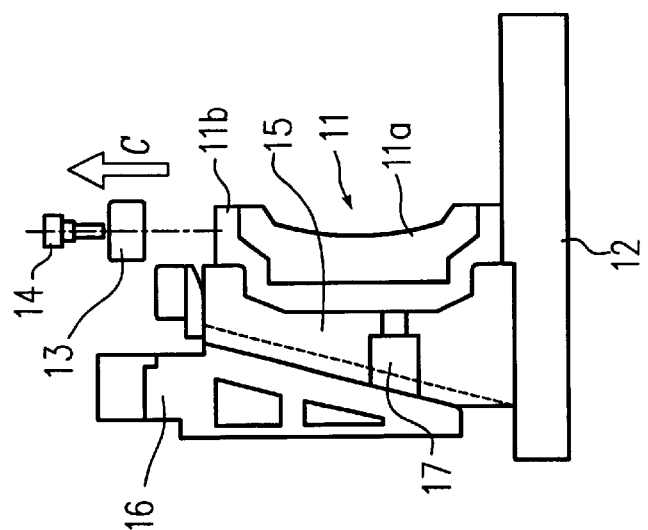
FIGS. 1a to 1c, FIGS. 2a to 2c and FIGS. 3a to 3c are left-half sectional views showing a conventional segmented mold and explaining the successive assembling steps thereof.

The present invention will be further described below with reference to the accompanying drawings.

First of all, the structure of a conventional segmented mold as well as the assembling steps thereof will be briefly explained below with reference to FIGS. 1a to 1c, FIGS. 2a to 2c and FIGS. 3a to 3c.

As widely known in the art, a segmented mold is comprised of a plurality of segmented tread mold pieces 11 of an arcuate shape, typically six to ten in number, each having circumferential end surfaces which extend in the radial direction of the tire to be produced. Each tread mold piece 11 may include a tread forming portion 11a for forming the outer contour of a tire tread portion, which is composed of aluminum alloy, as well as a frame portion 11b enclosing and holding the tread forming portion 11a from radially outer side, which is composed of cast iron. Alternatively, the tread mold piece may be a unitary member which is composed of cast iron as a whole. The tread mold pieces 11 are placed on a horizontal upper surface of a table 12 in annular arrangement, and temporarily connected to each other by a retainer ring 13. In this instance, the retainer ring 13 is connected to the tread mold pieces 11 by bolts 14 of the same number as the tread mold pieces 11.

A plurality of connector segments 15, which are same in number as the tread mold pieces 11, are suspended from a container ring 16 in their open state in which the connector segments 15 are expanded radially outwards. The container ring 16 together with the connector segments 15 is moved downwards from the upper and outer sides of the tread mold pieces 11 on the table 12, as indicated by arrow A in FIG. 1a. Each connector segment 15 has an inner surface which conforms with the outer surface of the tread mold piece 11, a tapered outer surface which is slidably engaged with a corresponding tapered inner surface of the container ring 16, as well as a bottom surface adapted to slide in the radial direction on a radial track (not shown) which is arranged on the upper surface of the table 12 on the radially outer side of the tread mold pieces 11. In this connection, the diameter of the tapered surface of the container ring 16 diminishes toward the upper side thereof, and this applies to the tapered surface of the connector segment 15, as well.

Figure 1B:
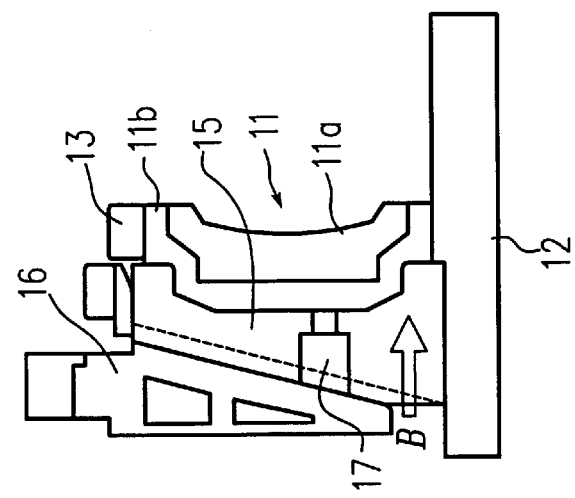
Figure 1C:
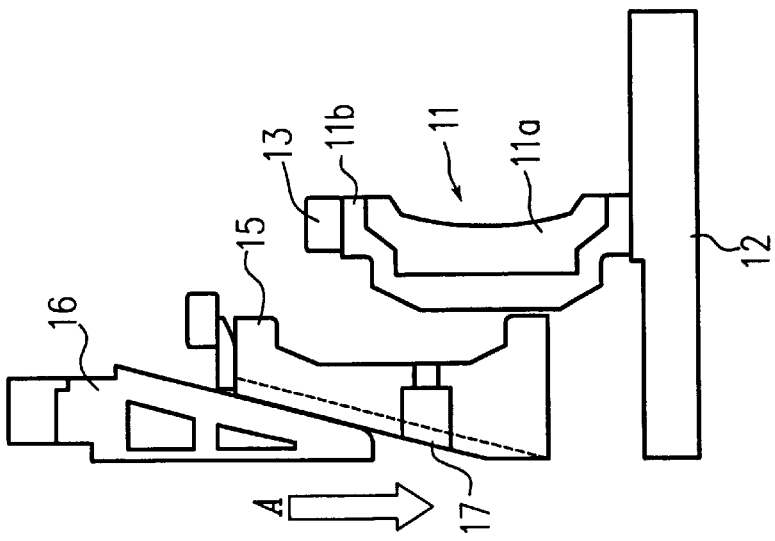

During the downward movement of the container ring 16 after the bottom surface of each connector segment 15 has been brought into contact with the radial track on the table 12, the connector segments 15 are moved radially inwards due to the sliding engagement of the tapered outer surface of the connector segment 15 with the tapered inner surface of the container ring 16, as indicated by arrow B in FIG. 1b, until the inner surfaces of the connector segments 15 are brought into contact with the outer surfaces of the tread mold pieces 11. In such a state, the annular arrangement of the tread mold pieces 11 can be maintained by the connector segments 15, and the retainer ring 13 is no longer necessary. Thus, the bolts 14 are unfastened so that the retainer ring 13 is removed from the tread mold pieces 11, as indicated by arrow C in FIG. 1c.

Figure 2A:
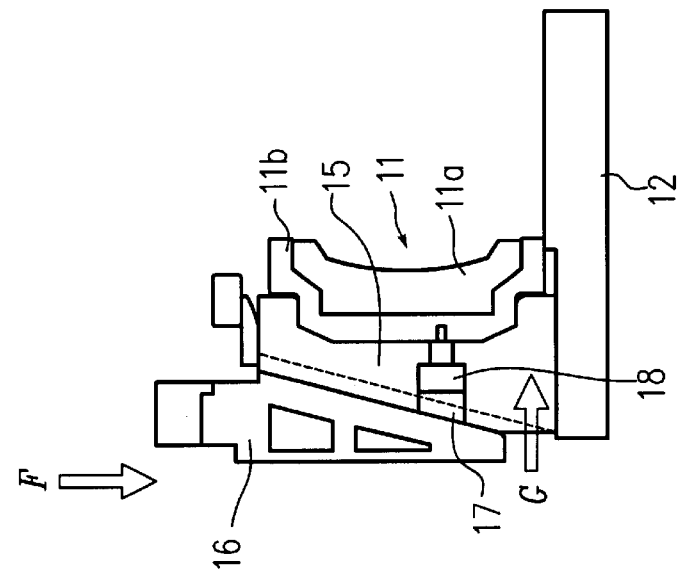

Subsequently, the container ring 16 is moved upwards so that each connector segment 15 is caused to slide radially outwards along the track on the table 12, as indicated by arrows D and E in FIG. 2a. After the sliding movement of the connector segments 15 has been completed, the tread mold pieces 11 are moved radially outwards and thereby brought into contact with the respective connector segments 15. In such a state, the tread mold pieces 11 and the connector segments 15 assume an open state.

Figure 2B:
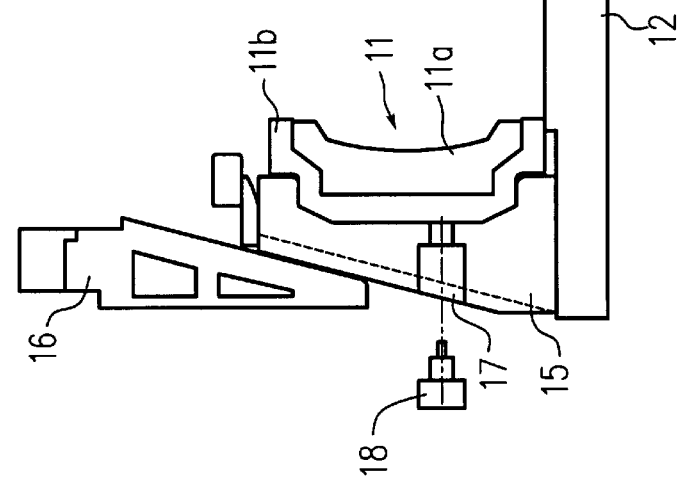

Each connector segment 15 has at least one radial bore 17 for receiving a connecting bolt 18 by which the connector segment 15 is detachably connected to the corresponding tread mold piece 11. The bore 17 extends through the connector segment 15, and has a spot facing to be engaged by the head of the connecting bolt 18. As shown in FIG. 2b, while maintaining the open state of the tread mold pieces 11 and the connector segments 15, the threaded end of the connecting bolt 18 is driven into a threaded bore in the outer surface of the tread mold piece 11 so as to firmly connect the connector segment 15 to the tread mold piece 11. In order to assure a proper connection between the tread mold pieces 11 and the connector segments 15, at least two bolts 18 are typically required for each connector segment 15.

Figure 2C:
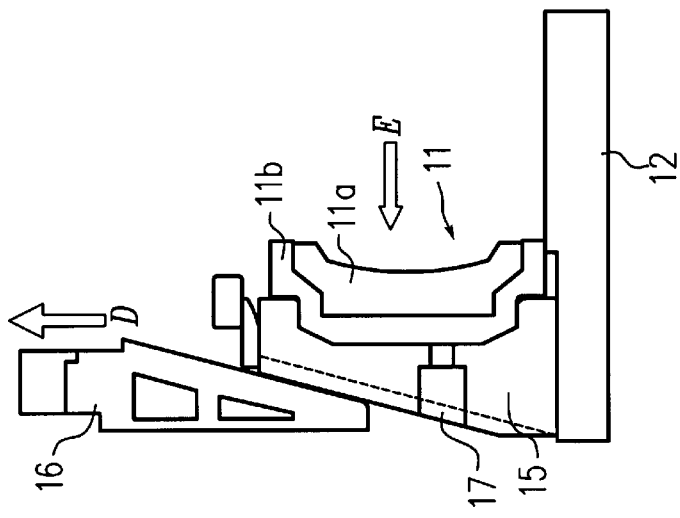

After the connector segments 15 have been firmly connected to the respective tread mold pieces 11, the container ring 16 is moved again downwards, so that the connector segments 15 and the tread mold pieces 11 are jointly moved radially inwards, as indicated by arrows F and G in FIG. 2c. Then, inspection is conducted to check whether or not the tread mold pieces 11 can be properly moved and an annular arrangement of the tread mold pieces 11 can be accurately maintained. If not, it is necessary to loosen the relevant connecting bolts 18 for adjusting the relative position of the tread mold pieces 11 and the associated connector segments 15.

Figure 3A:
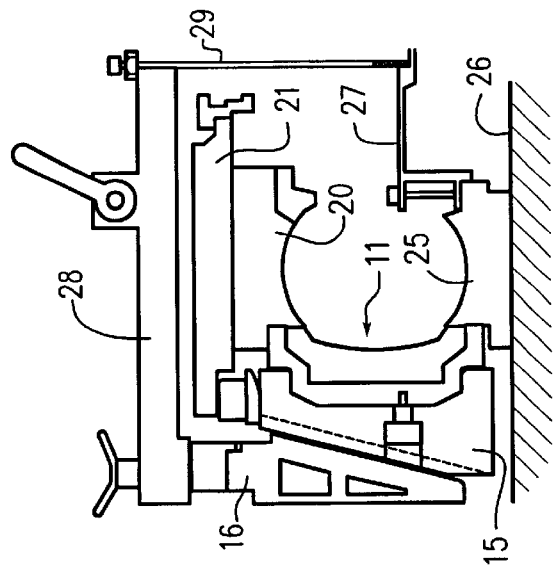

After it has been confirmed that tread mold pieces 11 can be properly moved and the annular arrangement of the tread mold pieces 11 can be accurately maintained, the container ring 16 is moved upwards as indicated by arrow H in FIG. 3a so that the connector segments 15 and the tread mold pieces 11 assume their open state. Then, a sub-assembly comprising an upper side mold member 20 and a top plate 21 is moved downwards from the upper side of the connector segments 15 and the tread mold pieces 11, as also indicated by arrow I in FIG. 3a. The upper side mold member 20 serves to form the outer contour of one of tire sidewall portions, and is connected to the top plate 21 by connecting bolts 19. It is assumed that, prior to the downward movement of the sub-assembly, a guide block 22 is connected to each connector segment 15, which is fitted in a radial groove of a guide ring 23. In this instance, the top plate 21 after the downward movement is fixedly connected to the guide ring 23 by connecting bolts 24.

Figure 3B:
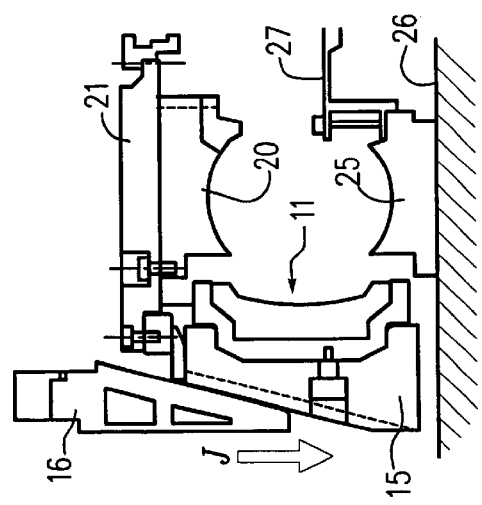

As shown in FIG. 3b, the tread mold pieces 11 and the connector segments 15 in their open state are moved from the table 12 onto a lower side mold member 25, together with the container ring 16, the upper side mold member 20 and the top plate 21. The lower side mold member 25 is arranged on a horizontal surface 26 which is situated at a location remote from the table 12, and serves to form the outer contour of the other tire sidewall portion which is opposite to the tire sidewall portion to be formed by the upper side mold member 20. These components of the connector segmented mold are centered with each other, before the container ring 16 and the components joined therewith are moved downwards from the upper side of the lower side mold member 25, as indicated by arrow J in FIG. 3b. After the downward movement of the container ring 16 has been completed, the upper side mold member 20 and the tread mold pieces 11 are integrated with the lower side mold member 25 to complete formation of the segmented mold.

Figure 3C:
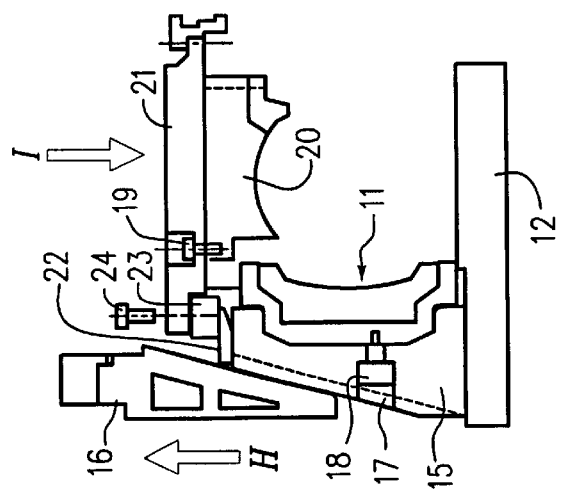

Subsequently, a suspension member 27 is connected to the lower side mold member 25, while another suspension member 28 is connected to the container ring 16, as shown in FIG. 3c. These suspension members 27, 28 are connected to each other through a connection rod 29. The mold is then lifted by a hoist, not shown, and transferred to a vulcanizing machine. The mold is disassembled in a sequence which is opposite to that for the assembling operation as explained above.

It can be appreciated that known segmented mold is composed of a large number of components and requires a large number of connecting bolts upon assembling operation. The centering of the components relative to each other is carried out manually, and a substantial time is required in particular for the connection of the tread mold pieces 11 and the respective connector segments 15. Moreover, manual movement of the components, connection and disconnection of the suspension members, operation of the hoist and the like have to be carried out many times, at various assembling stages such as the movement of the tread mold pieces 11 toward the respective connector segments 15 which are suspended from the container ring 16, the connection of the upper side mold member 20 and the top plate 21 to the connector segments 15, and the movement of the tread mold pieces 11, the connector segments 15 and the container ring 16 onto the lower side mold member 25.

Due to a significant number of assembling or disassembling steps in the conventional segmented mold, it has been difficult to improve the manufacturing productivity of tires particularly when changeover is to be effected between different specifications of tires and the previous mold has to be removed from the vulcanizing machine and replaced by a new mold. Also, various manual operations are involved in connection with installation or removal of the mold to or from the vulcanizing machine, and it is thus necessary to wait the operations until the vulcanizing machine has been sufficiently cooled down. Such necessity results in increased loss time and waste of heat energy which had been supplied to the vulcanizing machine and used for previous vulcanizing steps.

The above-mentioned drawbacks arising from the conventional arrangement of the segmented mold can be advantageously eliminated by the present invention. The novel and unique features of the segmented mold according to the present invention will be more fully described below with reference to the preferred embodiments.

A first embodiment of the segmented mold according to the present invention is shown in FIGS. 4 through 28. The mold according to the present invention comprises a plurality of tread mold pieces 101 of an arcuate shape as particularly shown in FIGS. 4 and 5. By way of example, there may be provided nine tread mold pieces 101 which are arranged in annular manner around a mold center axis Z. Each tread mold piece 101 has a pair of circumferential end surfaces 101v, and a recessed inner surface 101t which forms the outer contour of a tire tread portion inclusive of the tread pattern. It should be noted that grooves or sipes in the tire tread pattern are formed by thin metal plates on the inner surface of the mold piece 101, which are omitted from FIGS. 4 and 5 for the sake of simplicity.

When the segmented mold is comprised of nine tread mold pieces 101, the center angle of the mold piece 101, i.e., the angle defined by the circumferential end surfaces 101v of the mold piece 101 with reference to the mold center axis Z is typically 40 degrees, though such equiangular arrangement of the mold pieces 101 is not a prerequisite condition. The tread mold piece 101 in the illustrated embodiment is a unitary member comprised of cast iron. Alternatively, however, as explained above with reference to the conventional arrangement, each tread mold piece 101 may include a tread forming portion for forming the outer contour of a tire tread portion, which is composed of aluminum alloy, as well as a frame portion enclosing and holding the tread forming portion 11a from radially outer side, which is composed of cast iron.

Each tread mold piece 101 has a bottom surface 101a and an inner peripheral surface 101b at the bottom region, which are engaged by a lower side mold member, as well as an top surface 101c and an inner peripheral surface 101d at the top region, which are engaged by an upper side mold member. The details of the upper and lower side mold members will be described below.

Figure 4:
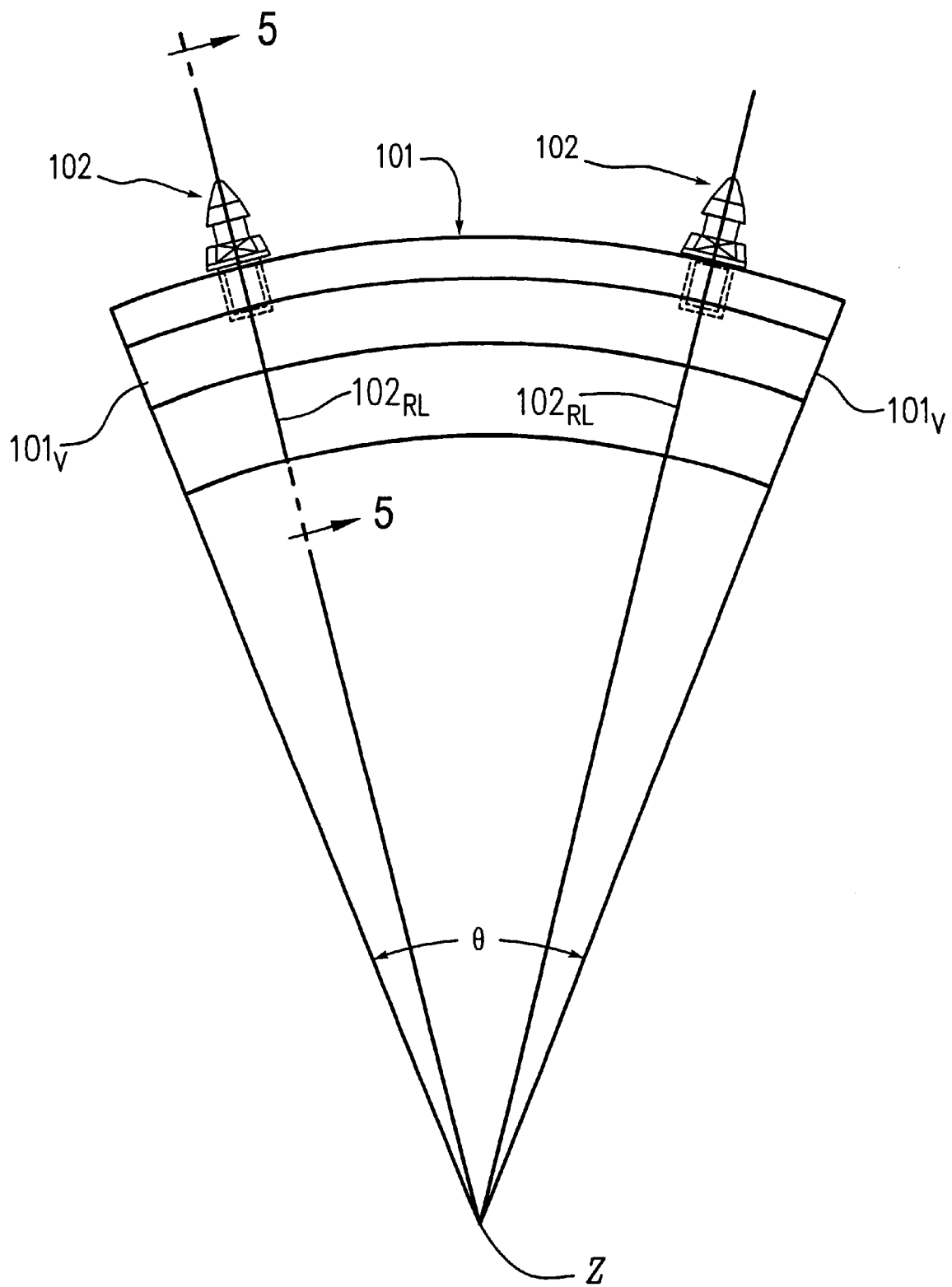
FIG. 4 is a plan view showing an individual tread mold piece for a segmented mold according to a first embodiment of the present invention.
Figure 5:
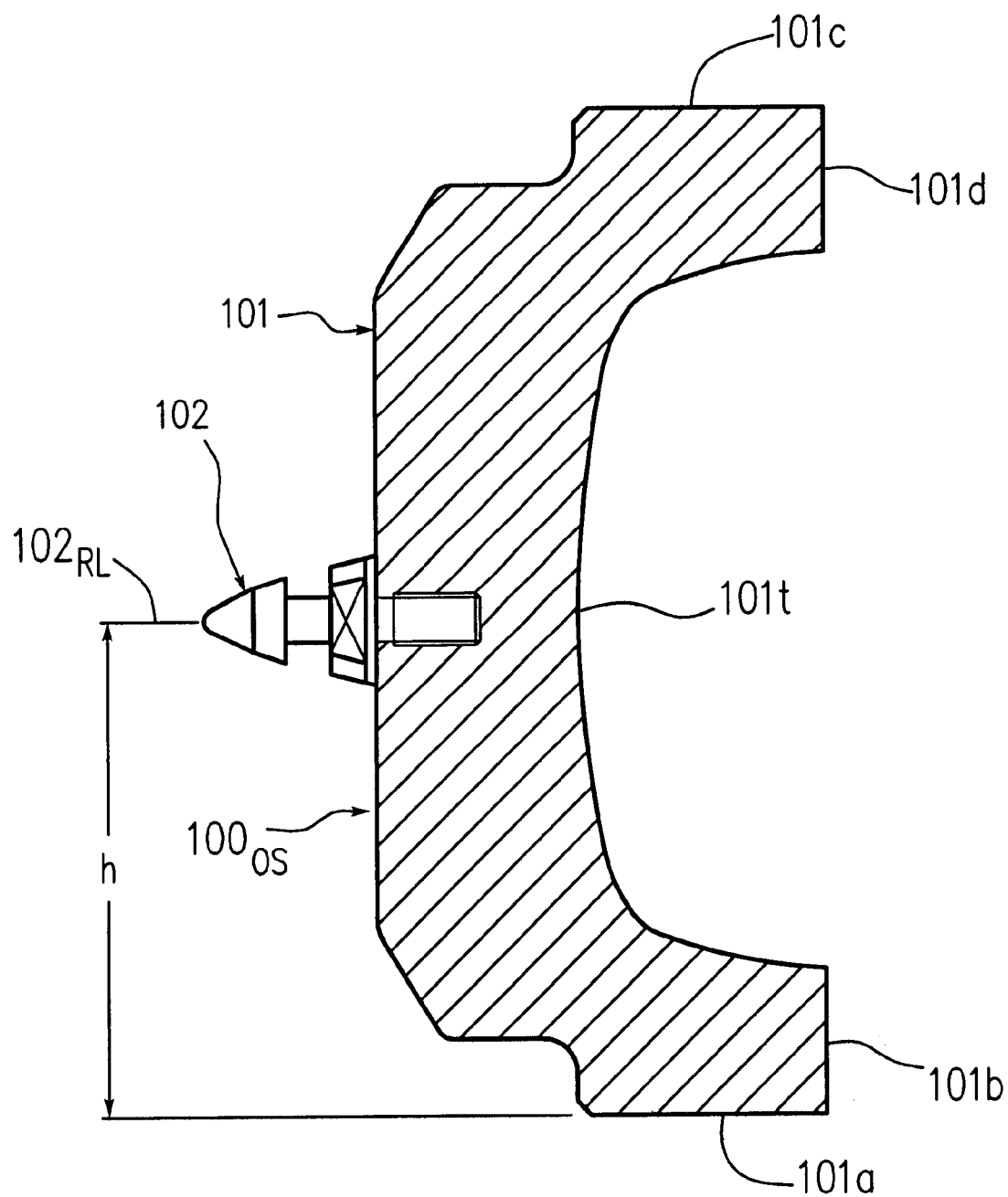
FIG. 5 is a sectional view taken along the line 5—5 in FIG. 4.

As shown in FIGS. 4 and 5, for each tread mold piece 101, a pair of latch members in the form of lock pins 102 are arranged on those regions of the outer peripheral surface $101_{OS}$ of the tread mold piece 101, which are situated adjacent to the circumferential end surfaces 101v. The lock pins 102 of the tread mold piece 101 are engageable with the relevant connector segment to be described below, and extend radially outwards from the outer peripheral surface $101_{OS}$ of the tread mold piece 101. Thus, each lock pin 102 has a center axis $102_{RL}$ which intersects with the mold center axis Z at right angles. For any tread mold piece 101, the height "h" of the center axis $102_{RL}$ of the lock pin 102 as measured from the bottom surface 101a of the tread mold piece 101 is constant. In other words, the center axes $102_{RL}$ of the entire tread mold pieces 101 are arranged in a common horizontal plane which is spaced from the bottom surface 101a of the tread mold piece 101 by a distance "h".

Figure 6:
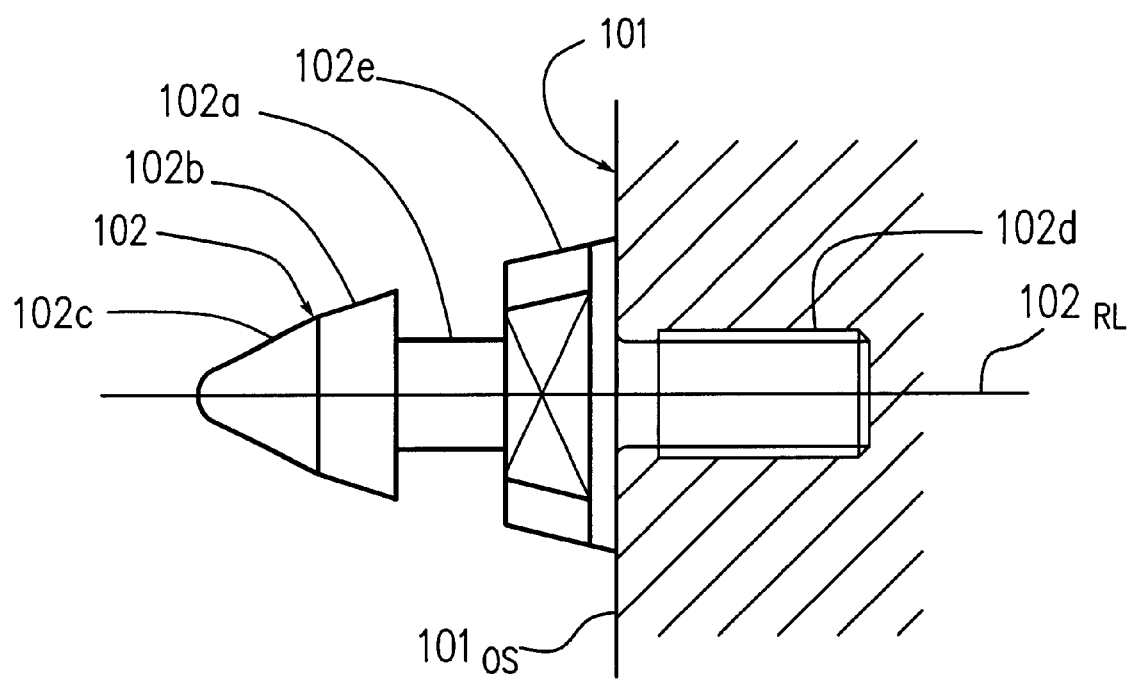
FIG. 6 is a side view showing a lock pin of the tread mold piece.

With reference to FIG. 6, the lock pin 102 comprises a shank 102a of substantially cylindrical shape, which is arranged adjacent to the outer peripheral surface $101_{OS}$ of the tread mold piece 101, a head 102b of substantially frustoconical shape, which is larger in diameter than the shank 102a and arranged on the radially outer side of the shank 102a, and a guide portion 102c of substantially conical shape, which is arranged on the radially outer side of the head 102b such that the diameter of the guide portion 102c diminishes toward the free end of the lock pin 102.

The lock pin 102 may be fixedly secured to the tread mold piece 101 by welding, for example. However, in order to facilitate maintenance of the mold, it is preferred that the lock pin 102 is detachably secured to the tread mold piece 101 by a threaded connection 102d. To this end, the lock pin 102 may further comprise a base portion 102e to be brought into contact with the outer peripheral surface $101_{OS}$ of the tread mold piece 101. In this instance, the base portion 102e of the lock pin 102 is provided with at least two flat surfaces which are in parallel with each other, so as to be engaged by an appropriate tool.

The tread mold piece 101 as explained above is combined with the connector segment 103 which will be described below with reference to FIGS. 7–11.

Figure 7:
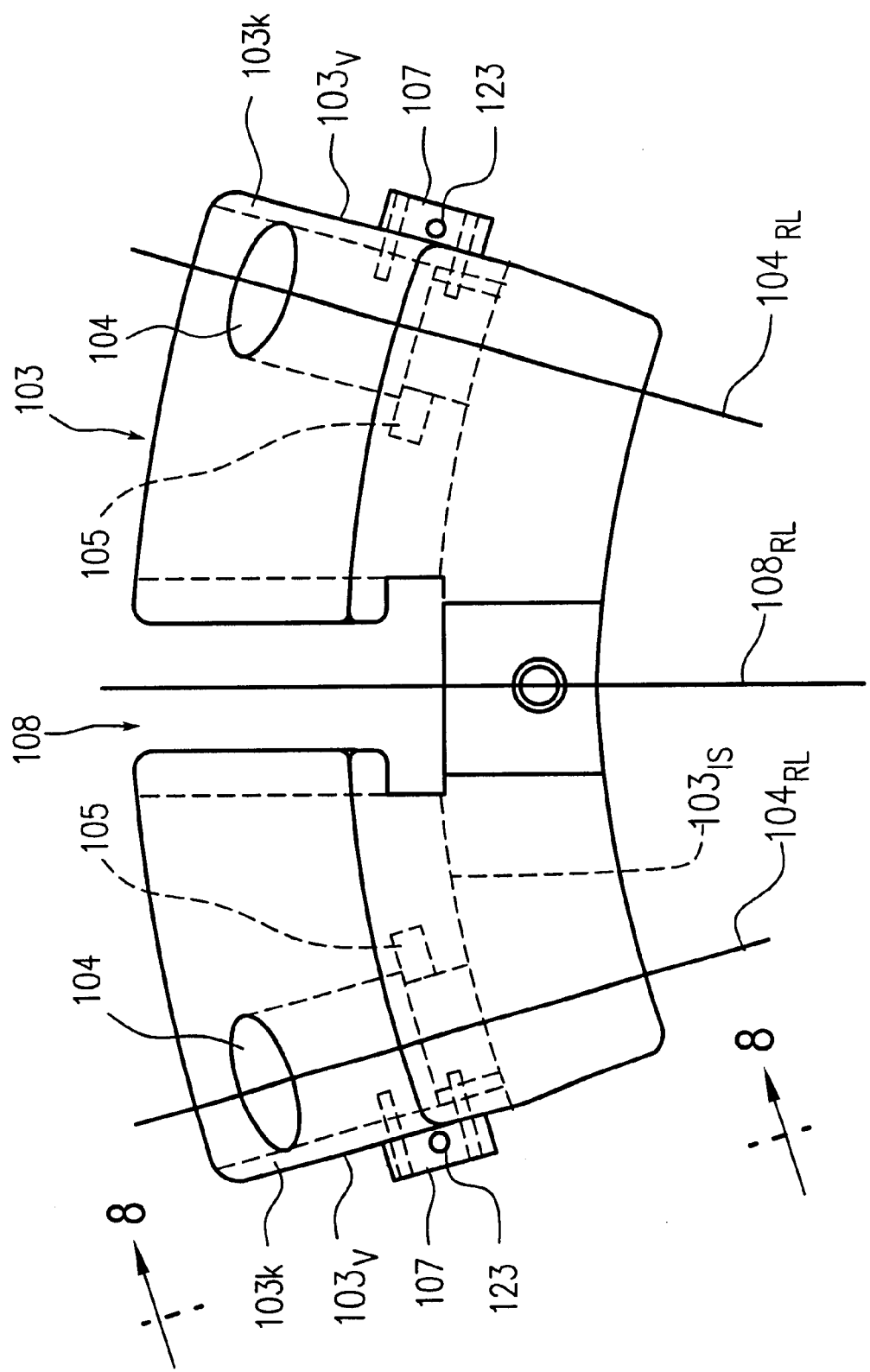
FIG. 7 is a plan view showing a connector segment to be detachably connected to the tread mold piece of FIG. 4.
Figure 8:
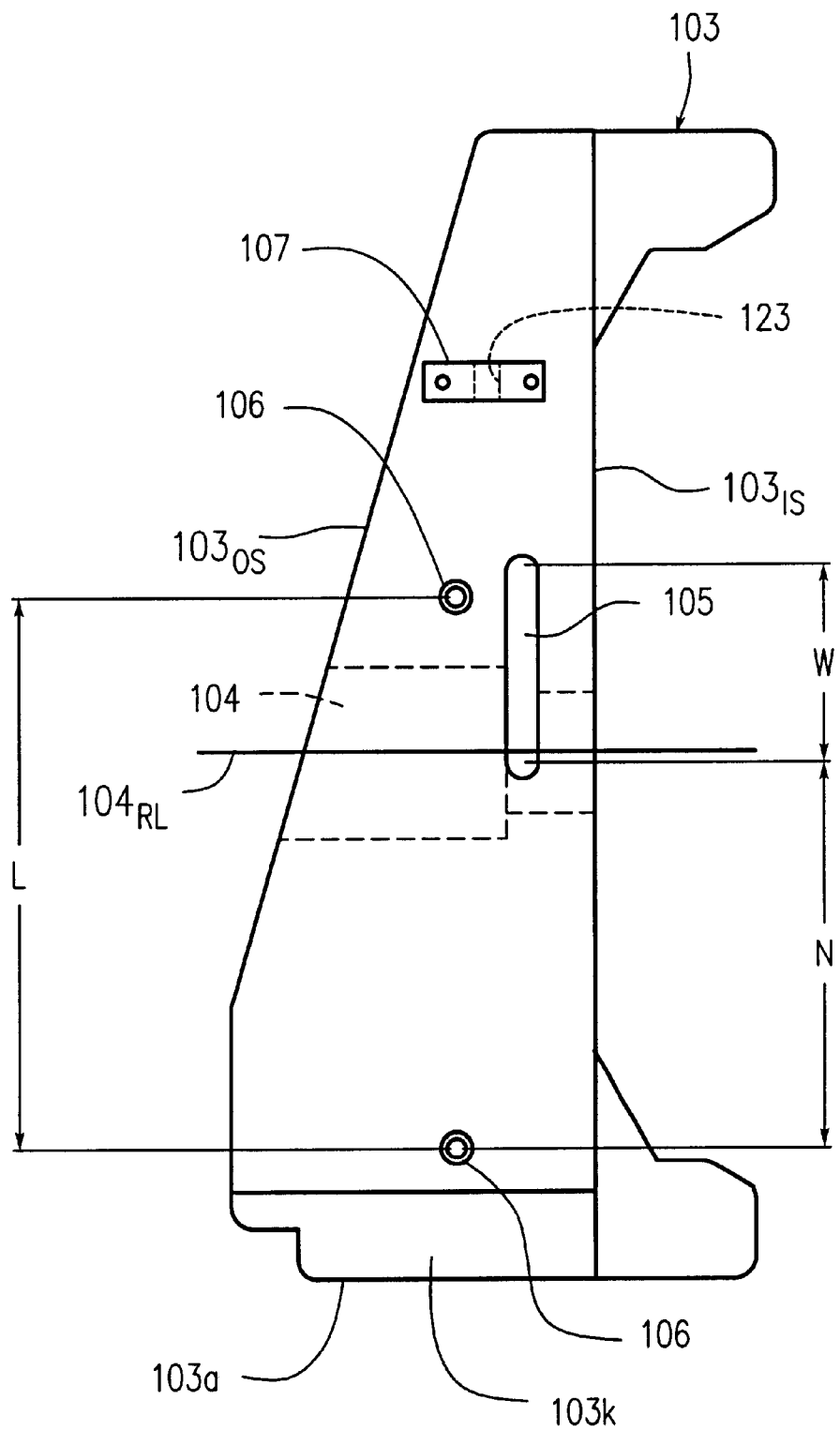
FIG. 8 is a side view of the connector segment as seen in the direction of line 8—8 in FIG. 7.

The connector segments 103 correspond in number to the tread mold pieces 101 so that there may be provided nine connector segments 103 which are also arranged around the mold center axis Z. As shown in FIGS. 7 and 8, each connector segment 103 has an inner peripheral surface $103_{IS}$ which corresponds in shape to the outer peripheral surface $101_{OS}$ of the tread mold piece 101. However, as described below, the inner peripheral surface $103_{IS}$ of the connector segment 103 has a circumferential length which is slightly smaller than that of the outer peripheral surface $101_{OS}$ of the tread mold piece 101.

The connector segment 103 has a pair of interior spaces in the form of through holes 104, which are arranged at the regions corresponding to the respective lock pins 102 of the tread mold piece 101. Thus, when the connector segment 103 is connected to, and locked with the tread mold piece 101, the center axis $104_{RL}$ of the through hole 104 substantially coincides with the center axis $102_{RL}$ of the relevant lock pin 102. The connector segment 103 has circumferential end surfaces 103v each of which is formed with a substantially vertical opening 105, as shown in FIG. 8. The opening 105 has a height W which is sufficient for allowing a vertical movement of the arm of a latch member to be described below. Two threaded holes 106 are formed in the circumferential end surface 103v, which are aligned with each other on one side of the opening 105, with a center distance L. The circumferential end surface 103v is provided with a bracket 107 to be engaged by a resilient member to be described below. The bracket 107 is arranged in the upper region of the circumferential end surface 103v, which is situated above the opening 105.

The connector segment 103 has an outer surface $103_{OS}$ which is tapered as shown in FIG. 8. A vertical guide groove 108 is formed in the center region of the connector segment 103 as seen in circumferential direction, so as to extend vertically along the outer surface $103_{OS}$ of the connector segment 103. The guide groove 108 is slidably engageable with a projection on the tapered inner surface of the container ring, so that a vertical movement of the container ring causes a radial movement of the connector segment 103. As shown in FIG. 7, the guide groove 108 may have a substantially T-shaped cross-section.

Figure 10:
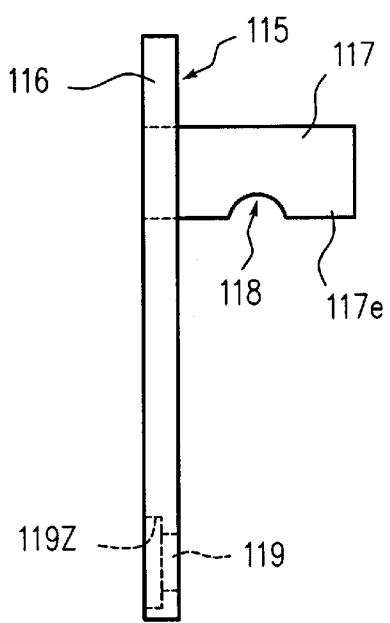
FIG. 10 is a front view of the latch member.

On each circumferential end surface 103v, the connector segment 103 is provided with a latch member 115 which is comprised of a vertical plate 116 extending along the circumferential end surface 103v, and a transverse arm 117 projecting from the vertical plate 116 into the opening 105. The vertical plate 116 and the transverse arm 117 are composed of metal plates, preferably steel plates. The transverse arm 117 is vertically movable in the opening 105 of the connector segment 103, and may be in the form of a rod. As shown in FIG. 10, the transverse arm 117 has a lower edge 117e which is formed with an arcuate or semi-cylindrical recess 118. In this instance, the center of the recess 118 is normally aligned with the center axis $104_{RL}$ of the through hole 104.

Figure 9:
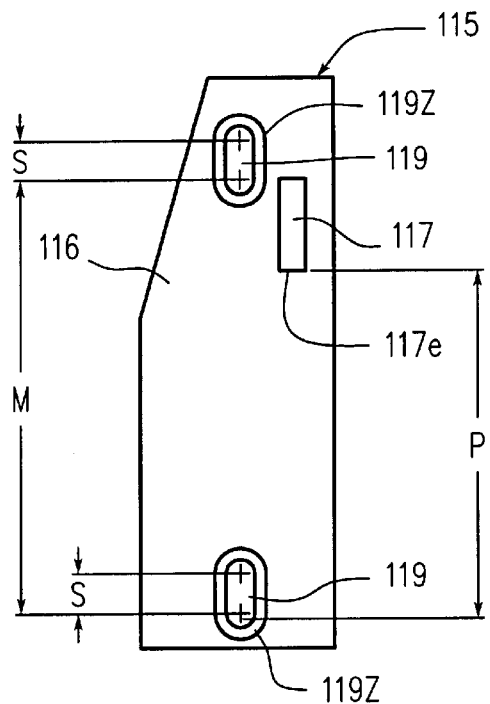
FIG. 9 is a side view showing a latch member of the connector segment in the first embodiment of the present invention.
Figure 11:
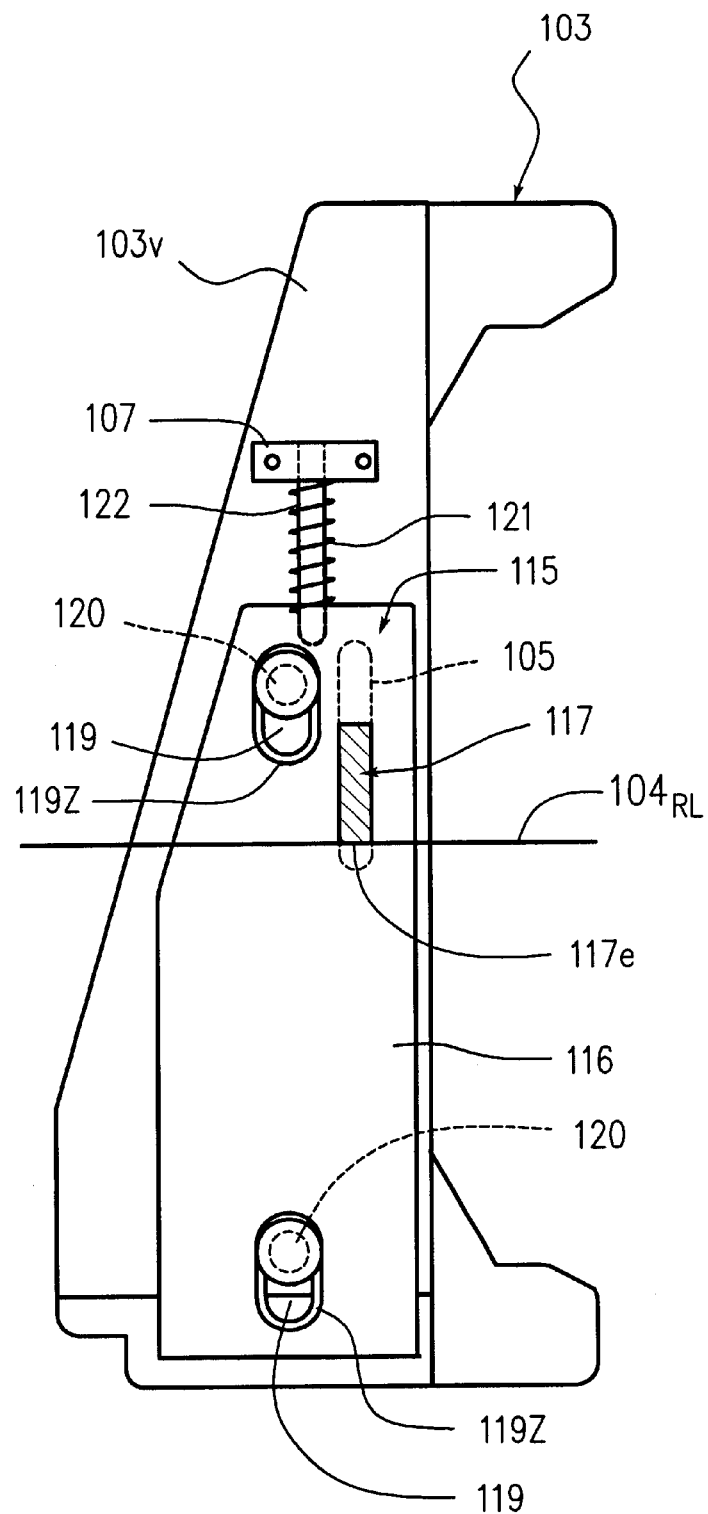
FIG. 11 is a side view similar to FIG. 8, but showing the connector segment which is equipped with the latch member of FIG. 9.

The vertical plate 116 is formed with two guide slits 119 each having upper and lower ends with semi-cylindrical surfaces. These slits 119 are aligned with each other in the vertical direction. As shown in FIG. 9, the center of semi-circle at the lower end of the upper guide slits 119 is spaced from the center of semi-circle at the lower end of the lower guide slits 119 by a distance M which is the same as the center distance L between the threaded holes 106 in the circumferential end surface 193v of the connector segment 103. Furthermore, for each guide slit 119, the distance S between the centers of the semi-circles at the upper and lower ends is the same as, or larger than the stroke of the transverse arm 117 in the opening 105. As shown in FIGS. 9 and 11, each guide slit 119 has an outer surface side which is provided with a spot facing 119z.

The spatial relationship between the transverse arm 117 and the guide slits 119 is the same as that between the opening 105 and the treaded holes 106 as shown in FIG. 8. Thus, the distance P between the center of semi-circle at the lower end of the guide slit 119 on the lower side and the lower edge 117e of the transverse arm 117 is the same as the distance N between the enter of semi-circle at the lower end of the opening 105 and the center of the lower threaded hole 106.

It should be noted that the latch members 115 on the opposite sides of the connector segment 103 are symmetrical in shape to each other. The latch member 115 shown in FIGS. 9 and 10 is for the circumferential end surface 103v of the connector segment 103, which is on the left side as seen in FIG. 7.

The latch member 115 as being incorporated into the connector segment 103 is shown in FIG. 11. In this instance, the latch member 115 is secured to the circumferential end surface 103v of the connector segment 103 by two guide pins 120 which are fitted in the guide slits 119, with the transverse arm 117 projected into the opening 105 as indicated by hatching in FIG. 11. Each guide pin 120 has a head corresponding to the spot facing 119z of the guide slit 119, a shank having a diameter which is slightly smaller than the width of the slit 119, and a threaded end which is engaged with the threaded hole 116 of the connector segment 103. Thus, the vertical plate 116 of the latch member 115 is vertically movable along the circumferential end surface 103v of the connector segment 103, and guided by the guide pins 120 in the guide slits 119.

As shown in FIG. 11, a resilient member in the form of a compression coil spring 121 is arranged between the upper edge of the vertical plate 116 and the bracket 107, and wound around a guide rod 122. The guide rod 122 has a lower end which is fixedly secured to the vertical plate 116, and an upper end which is slidably inserted into a vertical hole 123 in the bracket 107. As the vertical plate 116 is vertically moved relative to the connector segment 103, the guide rod 122 is slidably moved along the vertical hole 123. Due to the arrangement of the compression coil spring 121 between the vertical plate 116 of the latch member 115 and the bracket 107 on the connector segment 103, the latch member 105 is normally biased toward its lowermost position.

Figure 12:
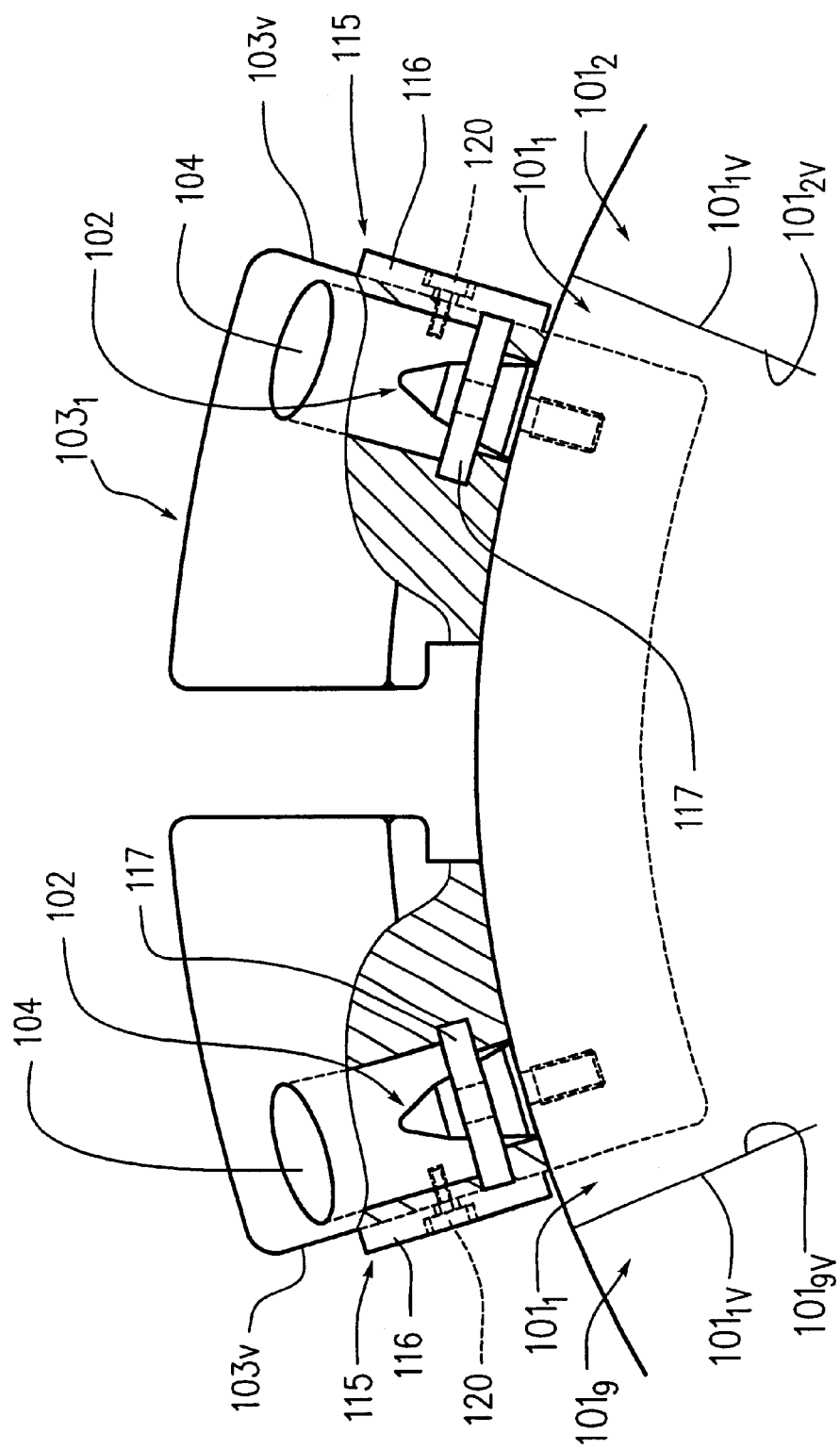
FIG. 12 is a plan view similar to FIG. 7, but showing the latch member of the connector segment in engagement with the lock pin of the tread mold piece.

FIG. 12 is a partly broken view showing that the tread mold piece 101 has been connected to the connector segment 103, with the lock pins 102 in locking engagement with the respective latch members 115. Assuming that the segmented mold is comprised of nine tread mold pieces 101, three mold pieces successively arranged adjacent to each other are shown in FIG. 12 and denoted by reference numerals $101_1$, $101_2$ and $101_9$, respectively. The circumferential end surfaces of the tread mold pieces are denoted by reference numerals $101_1v$, $101_2v$ and $101_9v$, respectively. Furthermore, the connector segment corresponding to the tread mold piece $101_1$ is denoted by reference numeral $103_1$. It can be seen that the tread mold pieces $101_1, 101_2, \ldots 101_9$ as shown in FIG. 12 assume a completely closed state wherein the mold is ready for operation. In this instance, a clearance is left between the opposite circumferential end surfaces of the connector segments which are adjacent to each other, for accommodating two latch members 115 on opposite circumferential end surfaces.

Although a precise explanation relating to the connection of the tread mold pieces 101 and the connector segments 103 during formation of the segmented mold will be made hereinafter, the lock pin 102 of the tread mold pieces 101 and the latch members 115 of the connector segments 103 are brought into a locking engagement in the following manner.

When the connector segment 103 is moved from radially outer side toward the tread mold piece 101, the lock pins 102 of the tread mold piece 101 is inserted into the respective through holes 104. As mentioned above, the center of the recess 118 at the lower edge 117e of the transverse arm 117 is normally aligned with the center axis $104_{RL}$ of the through hole 104. Thus, the conical guide portion 102c of the lock pin 102 is brought into engagement with the recess 118 of the transverse arm 117, to gradually move the transverse arm 117 upwards against the biasing force of the compression spring 121, as the diameter of the guide portion 102c increases. The upward movement of the transverse arm 117 as a result of further advancing movement of the lock pin 102 into the through hole 104 continues until the recess 118 is disengaged from the head 102b of the lock pin 102. Then, under the restoring force of the spring 121, the recess 118 of the transverse arm 117 is brought into engagement with, and resiliently urged against the shank 102a, thereby achieving a locking engagement of the lock pin 102 with the latch member 115. In this instance, the transverse arm 117 is retained between the head 102b and the base portion 102e in the axial direction of the lock pin 102, unless forcibly moved upwards. In order to assure a smooth locking engagement of the transverse arm 117 with the lock pin 102, it is preferred that the recess 118 at the lower edge 117e of the arm 117 has a radius of curvature which is as same as, or slightly larger than the maximum radius of the head 102b.

In consideration of the above-mentioned operation during the locking engagement of the transverse arm 117 with the lock pin 102, it is necessary for the opening 105 in the connector segment 103 to have a width which is slightly larger than the thickness of the transverse aim 117, and a height W which is sufficient for allowing an upward movement of the arm 117 when the transverse arm 117 is caused to ride over the head 102b of the lock pin 102 and engaged with the shank 102a, or disengaged from the shank 102a and ride over the head 102b of the lock pin 102.

The compression spring 121 arranged between the bracket 107 on the connector segment 103 and the upper edge of the vertical plate 116 of the latch member 115 may be replaced by a tension spring (not shown), which is arranged between the lower edge or the side surface of the vertical plate 116 and a bottom region of the connector segment 103 for normally biasing the vertical plate 116 to its lowermost position. The resilient member in the form of a compression or tension spring may be dispensed with, when the locking engagement of the transverse arm 117 with the lock pin 102 can be achieved by the own weight of the latch member 115.

The segmented mold according to the first embodiment of the resent invention will be further explained below, with reference to the components which are illustrated in FIGS. 13–19.

Figure 13:
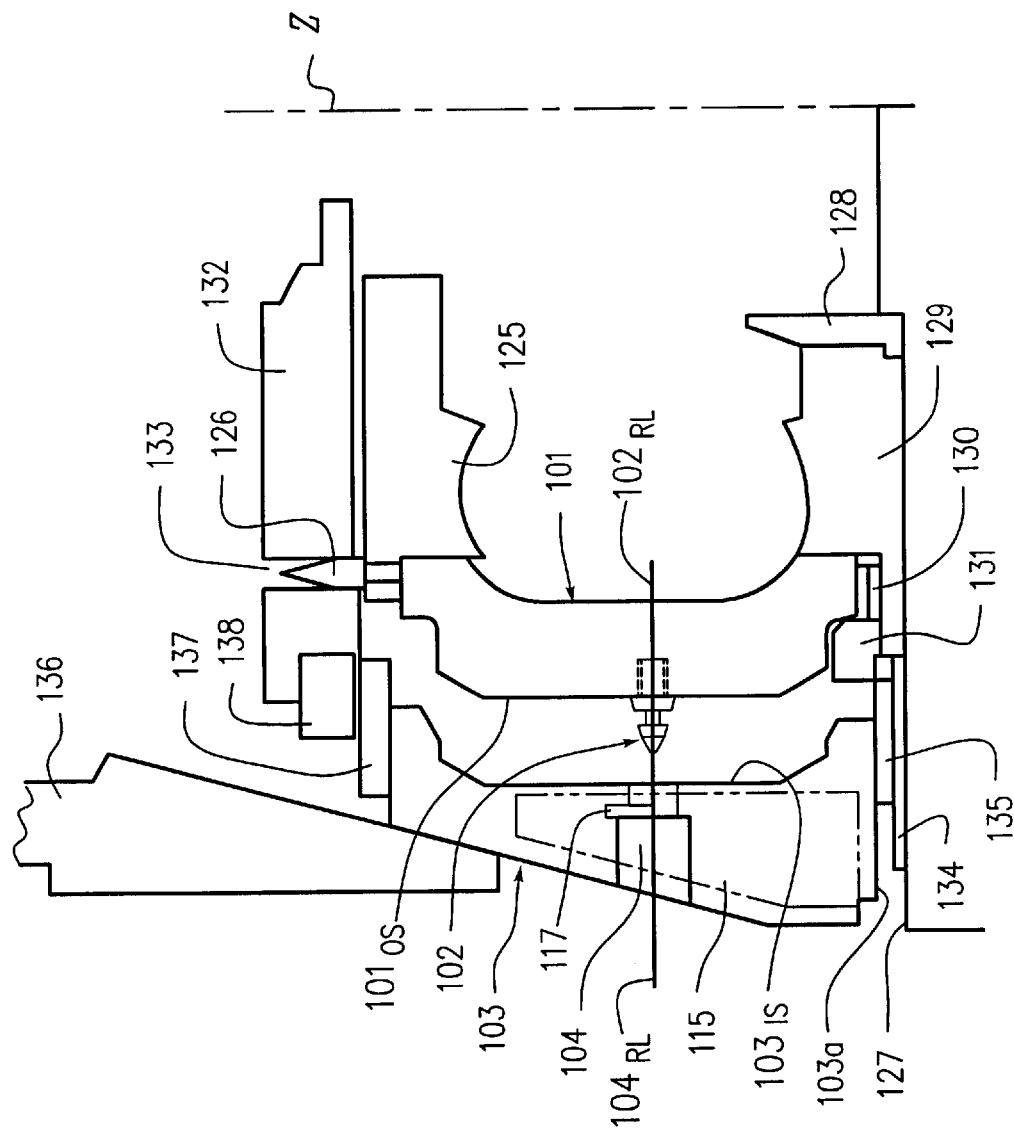
FIG. 13 is a left-half sectional view showing the segmented mold according to the first embodiment of the present invention.

An upper side mold member 125 is included in the mold, and has a cylindrical outer peripheral surface and a center opening, as shown in FIG. 13. The outer peripheral surface of the upper side mold member 125 conforms to the inner peripheral surfaces 101d (FIG. 5) of the tread mold pieces 101 which are successively arranged adjacent to each other in annular manner. The upper side mold member 125 has a top surface that is provided with a plurality of centering guide pins 126, e.g., three or four in number. Each centering guide pin 126 projects vertically upwards from the upper side mold member 125, and has a tapered upper end. These centering guide pins 126 are arranged on the same circle about the mold center axis Z, with equiangular relationship to each other. A plurality of threaded holes (not shown) are formed in the upper side mold member 125 and opened in the top surface. These threaded holes are arranged between adjacent centering guide pins 126 on the same circle about the center axis Z.

A top plate 132 is also included in the mold. As shown in FIG. 13, the top plate 132 has a plurality of trough holes 133 to be engaged by the centering guide pins 126 of the upper side mold member 125, and a plurality of through holes, not shown, for passing bolts therethrough which are to be threadedly engaged with the threaded holes in the upper side mold member 125 in order to firmly connect the top plate 132 to the upper side mold member 125.

Formation of the segmented mold is at least partly carried out a table 127 having a flat top surface which is provided with a substantially cylindrical register 128. The register 128 has an outer peripheral surface which conforms to the inner peripheral surface of the lower side mold member 129 also included in the mold. The lower side mold member 129 is similar to the upper side mold member 125 in that it has an outer peripheral surface which conforms to the inner peripheral surfaces 101d of the tread mold pieces 101.

Figure 14:
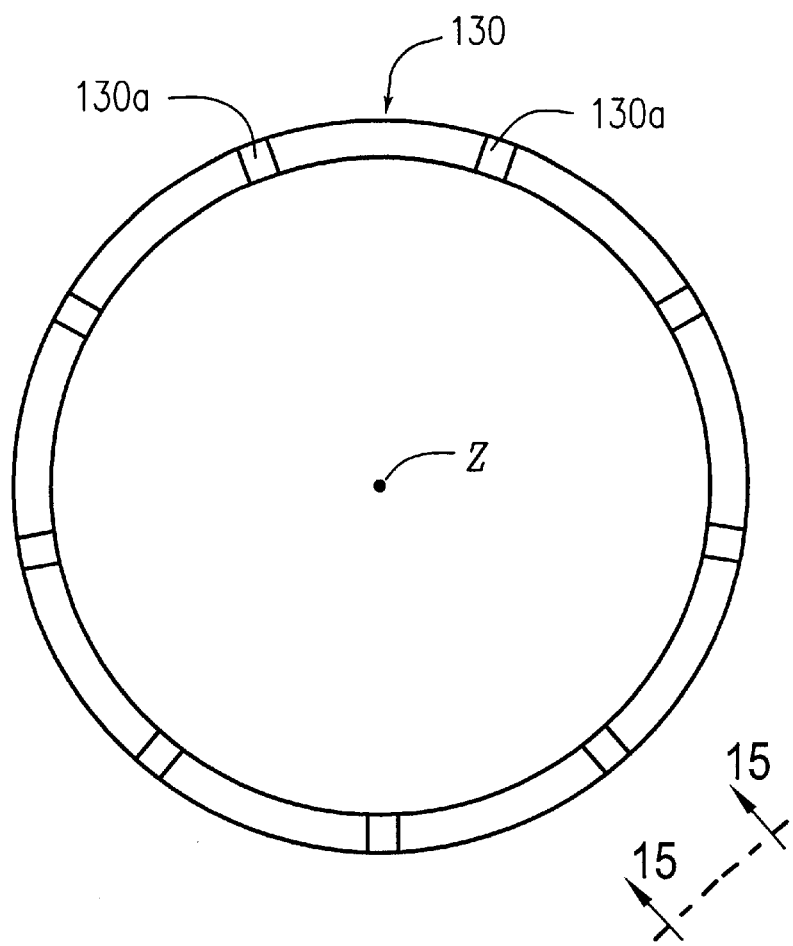
FIG. 14 is a plan view of a spacer ring in the segmented mold according to the first embodiment.
Figure 15:
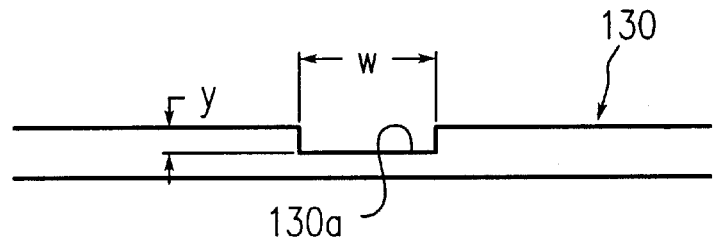
FIG. 15 is a side view of the spacer ring as seen in the direction of line 15—15 in FIG. 14.

The lower side mold member 129 is mounted on the top surface of the table 127. In this instance, it is preferred that a spacer ring 130 is arranged between the top surface of the lower side mold member 129 and the bottom surfaces 101a of the tread mold pieces 101, for adjusting the height of the tread mold pieces 101. The spacer ring 130 has a plurality of radial recesses 130a on its top surface which is brought into contact with the bottom surfaces 101a of the tread mold pieces 101. These recesses are arranged at the locations which correspond to the circumferential end surfaces 101v of the tread mold pieces 101. Thus, since the segmented mold in the illustrated embodiment is comprised of nine tread mold pieces 101, there are nine radial recesses 130a in the top surface of the spacer ring 103, each having a width "w" and a depth "y", as shown in FIGS. 14 and 15.

It is also preferred that a plurality of retainer members 131 are arranged on the table 127, for maintaining a proper upright position of the tread mold pieces 101 in combination with the spacer ring 130. Thus, there are nine retainer members 131 which are arranged adjacent to the radial recesses 130a of the spacer ring 130 such that each retainer member 131 uniformly supports the bottom surfaces adjacent to the opposite circumferential end surfaces 101v of neighboring tread mold pieces 101.

Figure 16:
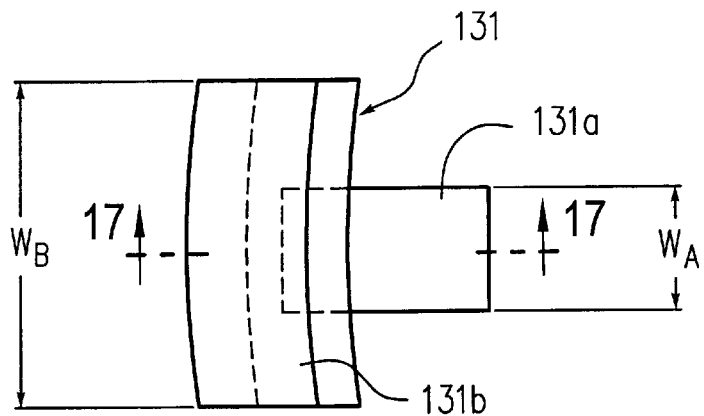
FIG. 16 is a plan view of a retainer element which can be used in combination with the spacer ring of FIGS. 14.
Figure 17:
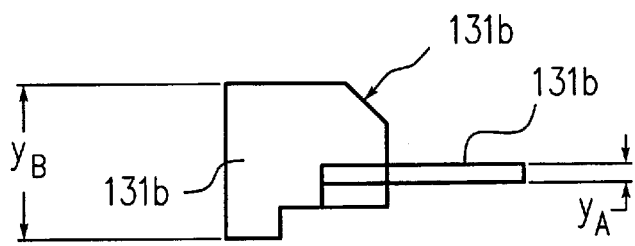
FIG. 17 is a sectional view of the retainer element taken along the line 17—17 in FIG. 16.
Figure 18:
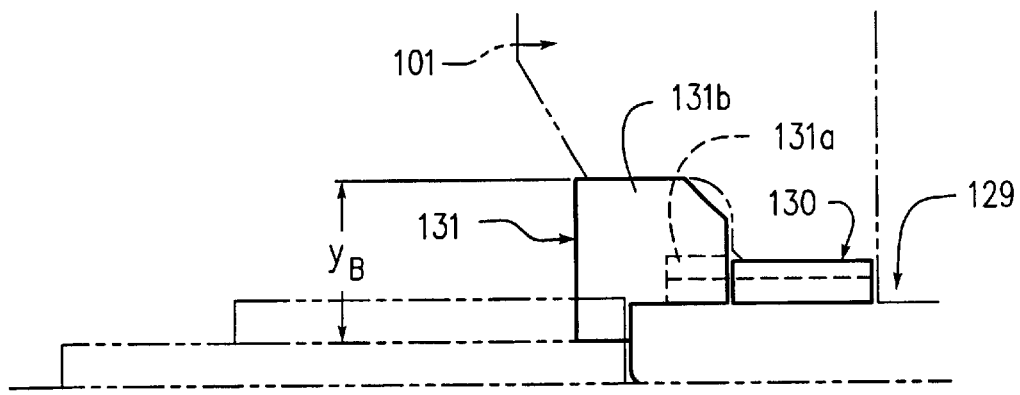
FIG. 18 is a sectional view of the spacer ring as being combined with the retainer element of FIG. 16.

As shown in FIGS. 16 and 17, each retainer member 131 is comprised of a projection 131a which protrudes radially inwards from a block 132b. The projection 131a is a plate having a width "$w_A$" and a height "$y_A$", which correspond to the width "w" and the depth "y" of the radial recess 130a in the spacer ring 130, respectively, such that the projection 131 is engaged in the corresponding recess 130a. The block 131b has a width "$w_B$" which is slightly smaller than the clearance between the opposite circumferential end surfaces 103v of the adjacent connector segments 103, and a height "$y_B$" which is suitable for supporting the radially outer regions of the bottom surfaces of the adjacent tread mold pieces 101. The width "$w_B$" of the block 131b is determined such that when the connector segments 103 are in locking engagement with the tread mold pieces 101, the block 131b can be accommodated in a recess 103k (FIGS. 7 and 8) formed between the opposite circumferential end surfaces 103v of the adjacent connector segments 103 in their bottom regions. FIG. 18 shows that the retainer members 131 in combination with the spacer ring 103 serve to maintain the desired upright position of the tread mold pieces 101.

A plate ring 134 is also arranged on the table 127, on the radially outer side of the lower side mold member 129, and a plurality of slide plates 135 are provided on the plate ring 134. The slide plates 135 serve to support and allow radial movement of the corresponding connector segments 103. The slide plates 135 are spaced from each other by a predetermined angular distance, with the opposite circumferential end surfaces 103v of the connector segments are situated therebetween.

A container ring 136 is shown in FIG. 13 as assuming a lifted position so that the connector segments 103 are open and not yet in licking engagement with the respective tread mold pieces 101. When the connector segments 103 achieve locking engagement with the tread mold pieces 101, the top plate 132 is brought into contact with the upper side mold member 125 and then firmly connected with each other by bolts.

In this connection, guide blocks 137 each having a guide projection are fixedly secured to the top surfaces of the connector segments 103. Corresponding to these guide blocks 137, a guide ring 138 is fixedly secured to the lower surface of the top plate 132, on its outer peripheral region. The guide ring 138 is formed with a plurality of radial guide grooves, in which the guide projections of the respective guide blocks 137 are slidably engaged. Thus, the movement of the connector segments 103 in the radial directions are guided by the sliding engagement of the guide blocks 137 relative to the guide ring 138.

The segmented mold according to the embodiment described above with reference to FIGS. 4 to 18 is assembled in the following manner.

Figure 19:
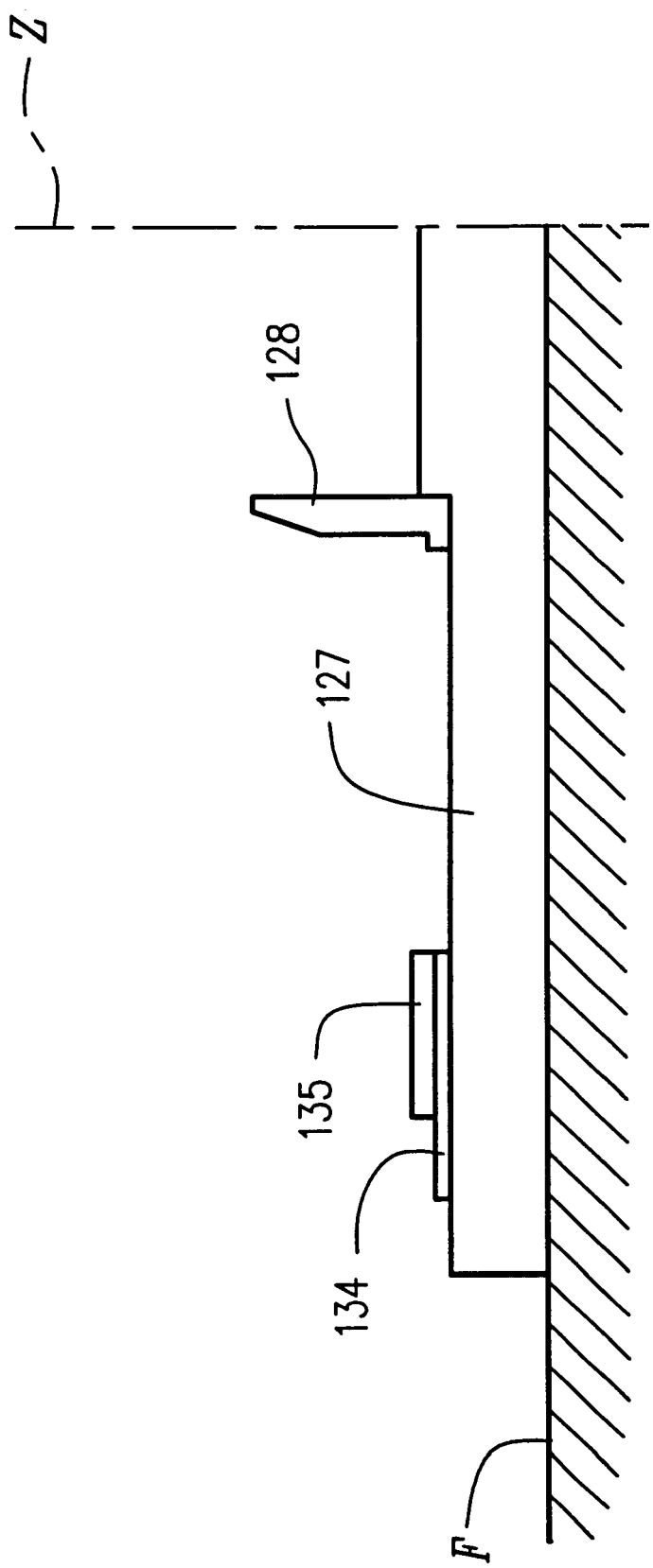
FIG. 19 is a left-half side view showing a table and associated components for forming the segmented mold according to the first embodiment.

As shown in FIG. 19, it is assumed that the register 128, the plate ring 134 and nine slide plates 135 are arranged on the table 127 about the center axis Z. The center axis Z is the axis of the tread mold pieces 101 when they are disposed in a proper annular arrangement. The table 127 is arranged on a floor F which may be either a floor surface remote from a vulcanizing machine, when the mold is to be formed as an outside arrangement, or the floor surface of the machine itself, when the mold is to be formed as an internal arrangement.

Figure 20:
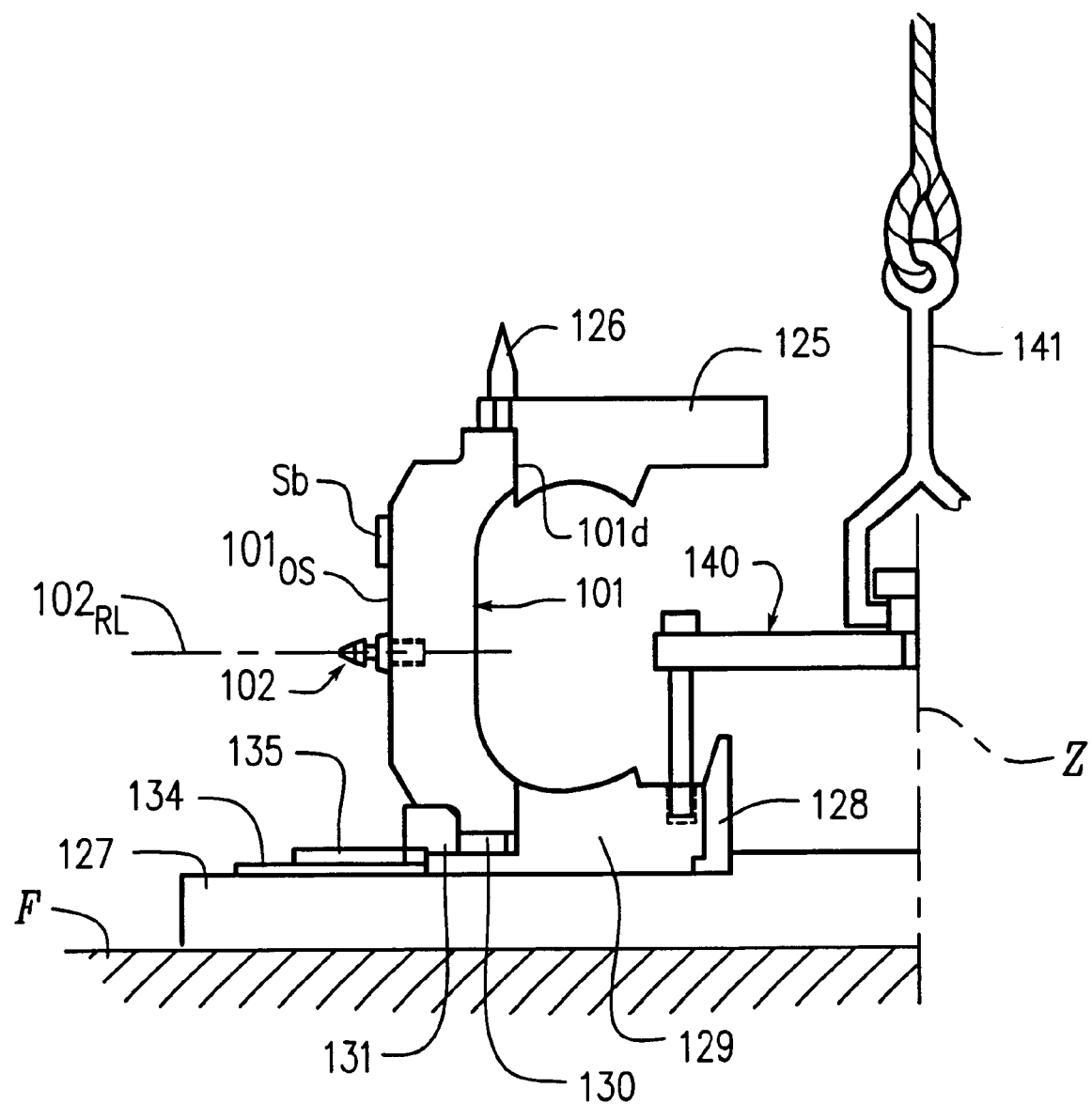
FIG. 20 is a left-half sectional view of the mold according to the first embodiment, in which the tread mold piece is combined with upper and lower side mold members.

In the assembling method shown in FIG. 20, nine tread mold pieces 101 are disposed on the lower side mold member 129 in annular arrangement without clearance. It is assumed that the spacer ring 130 combined with the retainer members 131 has already been interposed between the top surface of the lower side mold member 129 and the bottom surfaces 101a of the tread mold pieces 101. Subsequently, the upper side mold member 125 is fitted with the inner peripheral surfaces 101d at the upper side of the tread mold pieces 101.

The tread mold pieces 101 are fastened by a band Sb from the outer surfaces to maintain the desired annular arrangement and integrate the mold pieces 101 with each other. The sub-assembly including the tread mold pieces 101, and the upper and lower side mold pieces 125, 129 is then transferred onto the table 127. To this end, suspension fittings 140, 141 are connected to the lower side mold member 129. The sub-assembly transferred onto the table 127 is positioned such that the inner peripheral surface of the lower side mold member 129 is in contact with the outer peripheral surface of the register 128, and each circumferential end surfaces 101v of the tread mold pieces 101 is situated at the predetermined center position between two neighboring slide plates 135.

As an alternative method, the sub-assembly including the tread mold pieces 101, and the upper and lower side mold pieces 125, 129 may be directly formed on the table 127. In this instance, the tread mold pieces 101 and the upper and lower side mold members 125, 129 are integrated with each other in essentially the same way.

Figure 21:
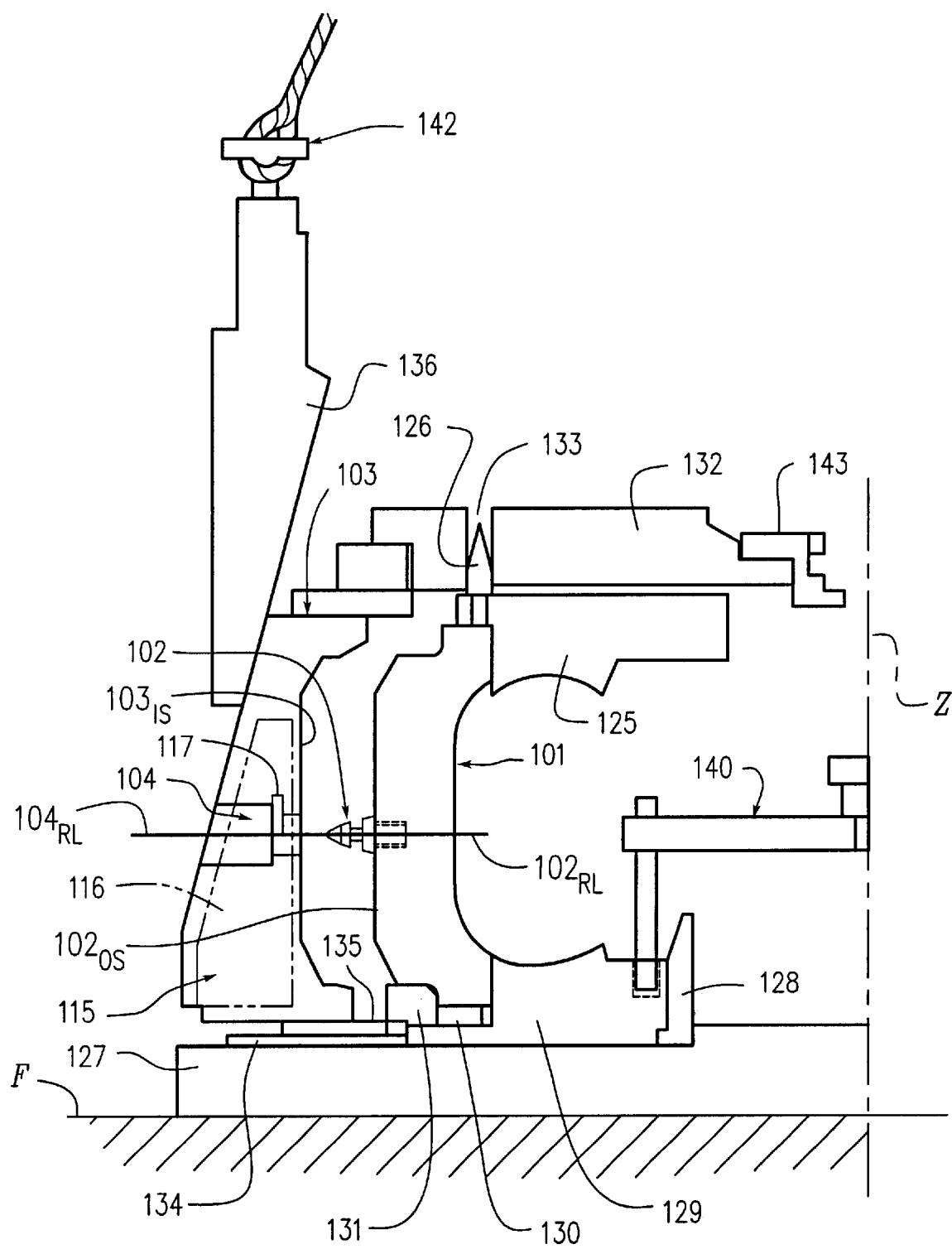
FIG. 21 is a left-half sectional view of the segmented mold according to the first embodiment, in which a container ring together with a connector segment and a top plate is being connected to the assembly shown in FIG. 20.

In either case, the band Sb is removed from the outer surfaces of the tread mold pieces 101. The spacer ring 130 and the retainer members 131 serve to ensure proper and facilitated operation after the removal of the band Sb. Subsequently, as shown in FIG. 21, the container ring 136 together with the connector segments 103 suspended therefrom and the top plate 132, which is carried by a hoist (not shown) through a suspension fitting 142, is lowered from the upper side of the sub-assembly of the tread mold pieces 101 and the upper and lower side mold pieces 125, 129. It is assumed that the guide blocks 137 on the connector segments 103 and the slide ring 138 of the top plate 132 are already in sliding engagement with each other.

When the connector segments 103 suspended from the container ring 136 are moved downwards and brought into contact with the slide plates 135 on their bottom surfaces, the through holes 133 in the top plate 132 are engaged with the centering guide pins 126 on the upper side mold member 125, thereby achieving the centering of the components with respect to each other. Thus, the lock pins 102 of the tread mold pieces 101 are aligned with, and opposed to the latch members 115 of the connector segments 103 so that they are ready for locking engagement with each other. In other words, with reference to the floor F, the height of the center axis $102_{RL}$ of the lock pin 102 coincide with the height of the center axis $104_{RL}$ of the through hole 104 of the corresponding connector segment 103. Incidentally, the upper side mold member 125 shown in FIGS. 20 and 21 is situated at slightly lower position in the axial direction of the mold, relative to the tread mold pieces 101.

As an alternative possibility. The container ring 136 and the segments 103 suspended therefrom may be transferred onto the sub-assembly of the tread mold pieces 101, and the upper and lower side mold pieces 125, 129. In this instance, the top plate 132 is subsequently transferred onto the connector segments 103 and the upper side mold member 125. The guide blocks 137 on the connector segments 103 and the slide ring 138 of the top plate 132 are then brought into sliding engagement with each other.

Figure 22:
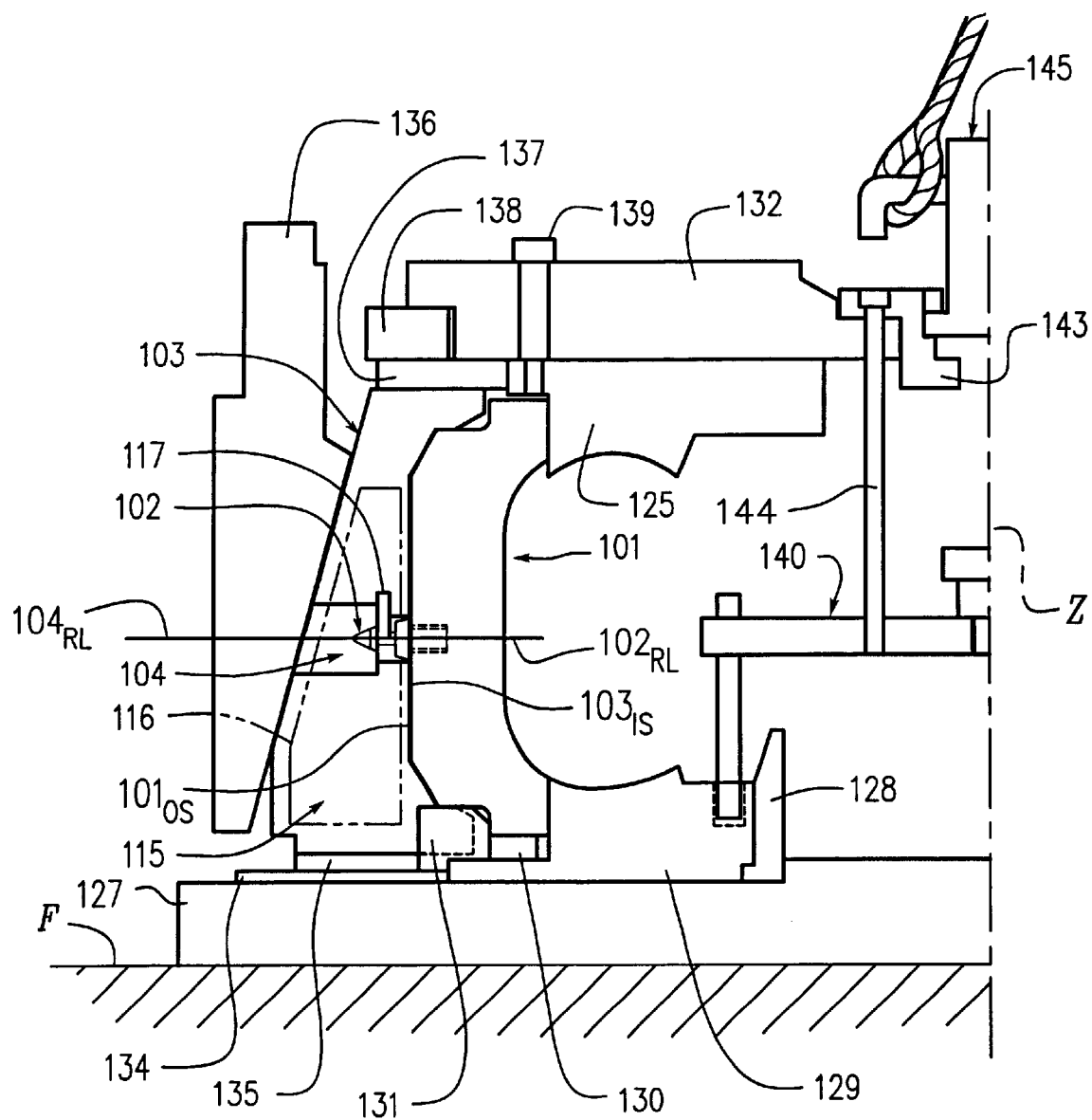
FIG. 22 is a left-half sectional view of the segmented mold according to the first embodiment, in which all components have been assembled.

The downward movement of the container ring 136 is continued even after the connector segments have been brought into contact with the slide plates 135 on their bottom surfaces, such that the connector segments 103 are moved radially inwards. By disconnecting the suspension fitting 142 from the container ring 136, as shown in FIG. 22, the container ring 136 continues the downward movement by its own weight so that the connector segments are further moved radially inwards. During such inward movement of the connector segments 103, the lock pins 102 of each tread mold piece 101 are advanced into the through holes 104 in the corresponding segment 103 and brought into contact with the latch members 115 at the recesses 118 of the transverse arms 117.

As each lock pin 102 is advanced into the though hole 104, the recess 118 of the transverse arm 117 is moved upward along the guide portion 102c of the lock pin 102, accompanying an upward movement of the vertical member 116 which is shown by an imaginary line in FIG. 22. The upward movement of the transverse arm 117 is changed into a downward movement as soon as the head 102b is passed by the transverse arm 117, when the recess 118 falls onto the shank 102a under the resilient biasing force of the compression spring 121 and the latch members 115 are thereby automatically engaged and locked with the corresponding lock pins 102.

After such locking engagement has been achieved between the lock pins 102 of the tread mold pieces 101 and the latch members 115 of the respective connector segments 103, the outer peripheral surfaces $101_{OS}$ of the tread mold pieces 101 and the inner peripheral surfaces $103_{IS}$ of the connector segments 103 are in contact with each other. Thereafter, bolts 139 are inserted through the above-mentioned holes in the top plate 132 and threadedly engaged with the correspondingly threaded holes in the upper side mold member 125, such that the upper side mold member 125 is firmly connected to the top plate 132 to complete assembly of the segmented mold.

When the assembly of the segmented mold is to be carried out within the vulcanizing machine, as an internal arrangement, the suspension fittings 140, 141 are removed from the sub-assembly shown in FIG. 20. The example shown in FIG. 22 is assembled at a location remote from the vulcanizing machine, as an external arrangement. In this instance, the suspension fitting 140 secured to the lower side mold member 129 is connected to the suspension fitting 143 secured to the top plate 132 by a rod 144, and a suspension fitting 145 suspended from a hoist, not shown, is connected to the suspension fitting 143 so as to transfer the assembled segmented mold to the vulcanizing machine.

The segmented mold according to the present invention is highly advantageous in that the number of bolts for connecting various components to assemble the mold is significantly reduced as compared to the prior art. This means at the same time that the time required for positioning the threaded holes in the tread mold pieces 11 and the bolts 18 passed through the through holes 17 in the connector segments 13 can be significantly reduced. The centering of the components relative to each other can be achieved automatically, and it is thus possible to use the segmented mold and produce pneumatic tires of higher product quality and dimensional accuracy.

Moreover, in the segmented mold according to the present invention, the top plate can be connected to the upper side mold member in a facilitated manner, and the requirement for the transfer of the components is minimized. Therefore, it is possible to complete changeover in size of the tire to be subjected to vulcanization, in a minimized time, to significantly improve the manufacturing productivity.

The segmented mold of the above-mentioned embodiment can be disassembled according to the sequence to be described below with reference to FIGS. 23 to 28.

Figure 23:
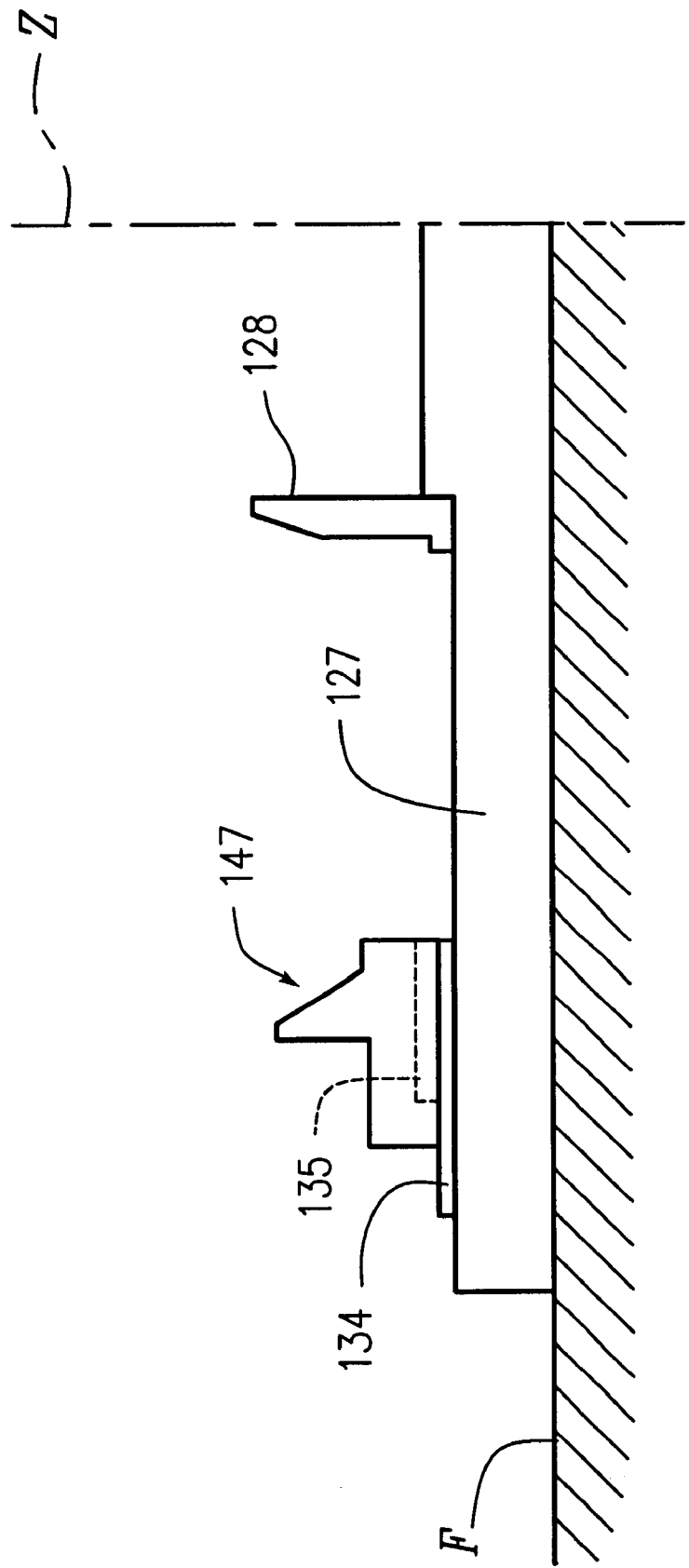
FIG. 23 is a left-half view of the table and associated components for disassembling the segmented mold according to the first embodiment.

As shown in FIG. 23, the table 127 is arranged on a floor F which is located at a location remote from the vulcanizing machine. The table 127 is provided with nine projection members 147 on the plate ring 134, each arranged in the clearance between the neighboring slide plates 135.

Figure 24:
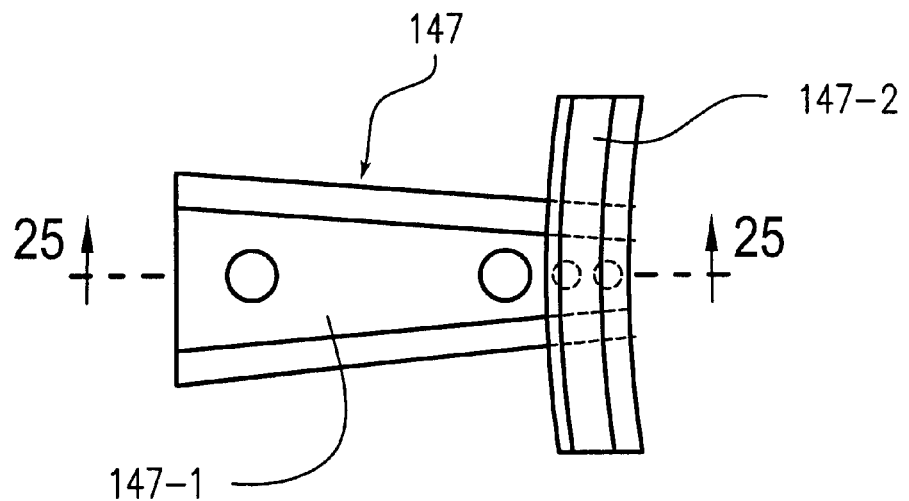
FIG. 24 is a plan view of the projection member in the segmented mold according to the first embodiment, for disengaging the connector segment from the tread mold piece.
Figure 25:
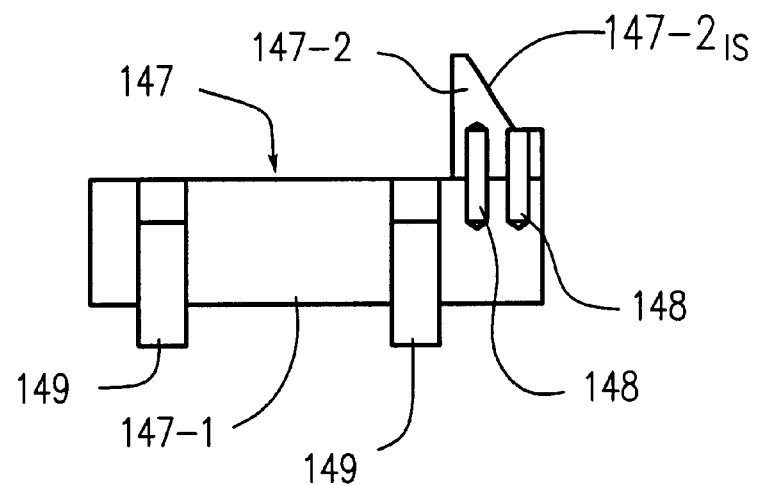
FIG. 25 is a sectional view of the projection member taken along the line 25—25 in FIG. 24.

With reference to FIGS. 24 and 25, each projection member 147 is comprised of a base 147-1 to be secured to the plate ring 134, and a support 147-2 for supporting the corresponding tread mold piece 101. The base 147-1 and the support 147-2 of the projection member 147 may be separately prepared and connected to each other by a spring pin or a self-lock pin 148. Alternatively, however, the base 147-1 and the support 147-2 of the projection member 147 may be formed as an integral body. The support 147-2 has an inner peripheral surface $147\text{-}2_{IS}$ having a curved surface which is brought into a surface contact with the bottom surface of the tread mold piece 101, for supporting the tread mold piece 101 at its bottom region.

As shown In FIG. 24, it is preferred that the base 147-1 of the projection member 147 has a tapered shape such that its width diminished toward the mold center axis Z. Preferably, the base 147-1 is fixedly secured to the plate ring 134 by a spring pin 149 in order to facilitate the operation. As seen in the radial direction, or along the line intersecting at right angles with the line 25—25 in FIG. 24, the base 147-1 has a trapezoidal cross-section. Alternatively, however, the base 147-1 may have an ordinary square cross-section.

Figure 26:
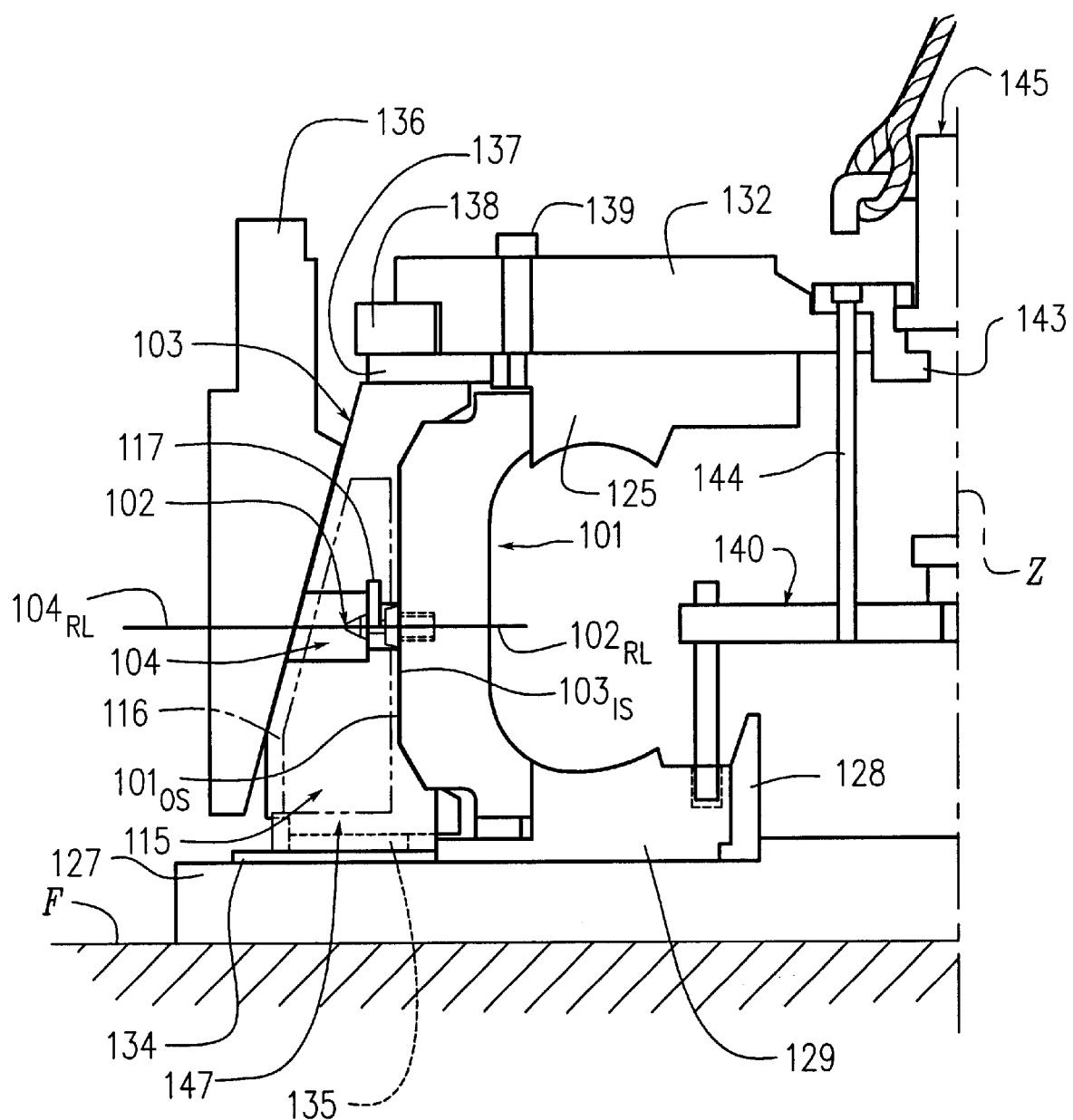
FIG. 26 is a left-half sectional view showing the segmented mold according to the first embodiment, which has been placed on the table shown in FIG. 23.
Figure 27:
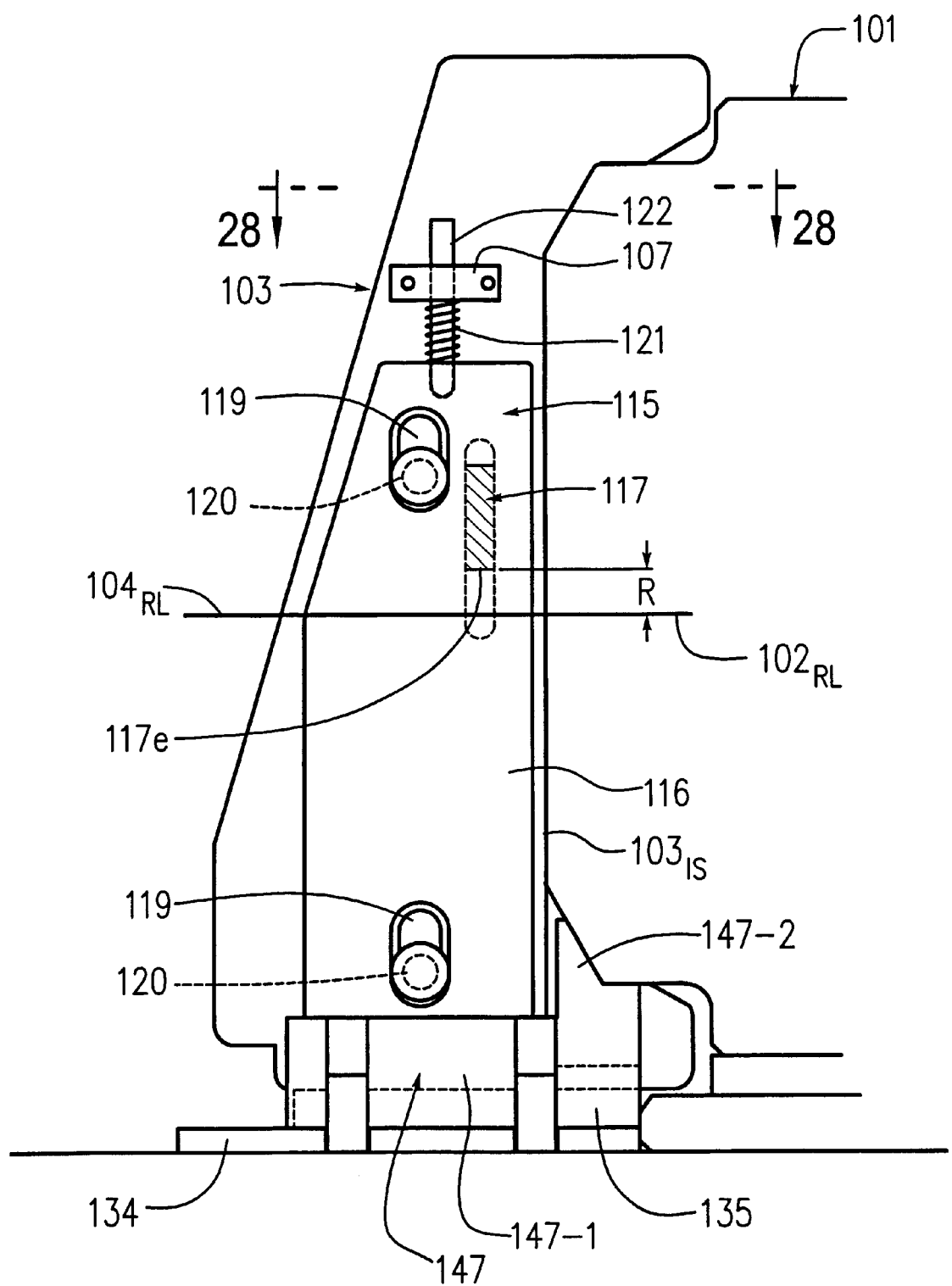
FIG. 27 is a side view showing the latch member of the connector segment in engagement with the projection member shown in FIG. 26.
Figure 28:
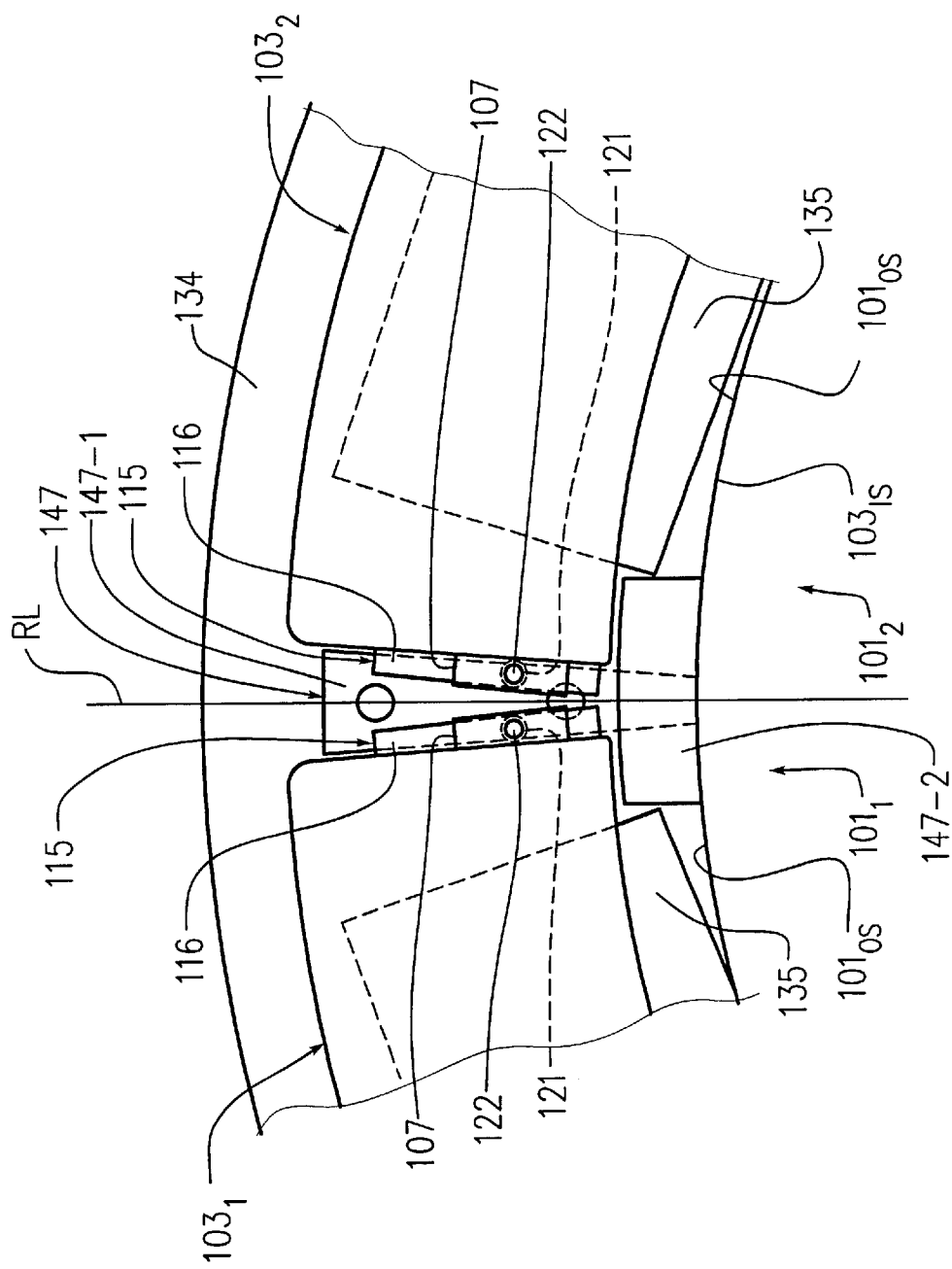
FIG. 28 is a plan view as seen in the direction of line 28—28 in FIG. 27, showing the latch members of adjacent connector segments in engagement with the projection member shown in FIG. 26.

As shown in FIG. 26, the segmented mold in its state ready for operation is removed from the vulcanizing machine and transferred to a position above the table 127. The segmented mold is then moved downwards such that the inner peripheral surface of the lower side mold member 129 is brought into engagement with the outer peripheral surface of the register 128. It is assumed that each projection member 147 is situated in the clearance between the opposite circumferential end surfaces of the neighboring connector segments 103$_1$, 103$_2$, and positioned with reference to the radial straight line RL corresponding to the circumferential end surfaces 101$v$ of the neighboring tread mold pieces 101$_1$, 101$_2$, as shown in FIGS. 27 and 28. In this connection, the segmented mold is moved downwards such that the vertical plates 116 of the latch members 115 which are opposed to each other are brought into contact with the base 147-1 of the projection member 147.

Thus, when the segmented mold is placed on the table 127, the base 147-1 of the projection member 147 causes the vertical plates 116 to move upwards along the circumferential surfaces of the connector segments 103. The base 147-1 of the projection member 147 has a height which is sufficient for the recess 118 in the lower edge 117$e$ of the transverse arm 117 to move vertically upwards beyond the head 102$b$ of the lock pin 102.

After the upward movement of the vertical plate 116 has been completed, the locking engagement between the lock pins 102 of the tread mold pieces 101 and the latch members 115 of the connector segments 103 is automatically released. In this condition, as shown in FIG. 27, the lower edge 117$e$ of the transverse arm 117 of the latch member 115 is spaced from the center axis 102$_{RL}$ of the lock pin 102 by a distance R. As also shown in FIG. 27, the guide pins 120 on the upper and lower sides are situated at the bottom ends of the respective guide slits 119, and the compression spring 121 is in its compressed state.

With the locking engagement between the lock pins 102 and the latch members 115 released, bolts 139 are removed to disconnect the top plate 132 from the upper side mod member 125. Then, in the sequence opposite to the assembly, the container ring 136 is moved upwards and thereby move the connector segments 103 radially outwards. The container ring 136, the connector segments 103 and the top plate 132 are then transferred to a storage space.

Subsequently, if necessary, the tread mold pieces 101 are fastened by the band Sb from the outer peripheral surfaces 101$_{OS}$ so as to maintain the annular arrangement of the tread mold pieces 101. The annular arrangement of the tread mold pieces 101 is maintained by the supports 147-2 of the projection members 147, even before the band Sb is applied. The disassembly of the segmented mold is now completed. Thus, the sub-assembly comprised of the tread mold pieces 101 and the upper and lower side mold members 125, 129 can be transferred to a storage space, by a hoist and through the suspension fittings 140, 141.

It can be appreciated from the foregoing description that the segmented mold according to the present invention does not require disconnection of bolts which have been required in the prior art for connecting the connector segments to the tread mold pieces. The locking engagement of the connector segments and the tread mold pieces can be automatically achieved and released. It is thus possible to significantly reduce the time and labor for assembling or disassembling the segmented mold.

In order to confirm the advantages of the present invention, there was prepared a sample of the segmented mold according to the present invention, which is for producing radial tires for passenger car use, having a tire size of 165/70R13. The segmented mold has a structure shown in FIGS. 4–18, and is comprised of nine tread mold pieces 101. The upper side mold member 125 has two centering guide pins 126 for the top plate 132, and the top plate 132 is connected to the upper side mold member 125 by two bolts 139. There was also prepared a sample of the conventional segmented mold as shown in FIGS. 1$a$–1$c$, 2$a$–2$c$ and 3$a$–3$c$, which is also for producing radial tires of the same specification and comprised of nine tread mold pieces 101.

With these sample segmented molds, comparison has been made in respect of the number of connecting bolts to be fastened or unfastened, the number of connecting or disconnecting fittings for transfer, the number of transfer by hoist, and the time required for assembling and disassembling a segmented mold. The result of such comparison is shown in Table 1 below, wherein the required time is represented by indices with the time for the conventional mold represented as 100. A smaller index shows that less time is required for the assembly or disassembly of the mold.

TABLE 1

| Compared items | Mold according to the invention | | Conventional mold | |
| --- | --- | --- | --- | --- |
| | Assembly | Disassembly | Assembly | Disassembly |
| Number of bolts | 4 | 4 | 49 | 49 |
| Connection/ disconnection of the fittings | 5 times | 5 times | 11 times | 9 times |
| Transfer by hoist | 5 times | 5 times | 11 times | 10 times |
| Required time (index) | 50 | 50 | 100 | 100 |

It can be seen from Table 1 above that, according to the present invention, the number of bolts to be fastened or unfastened for connecting or disconnecting the components of the segmented mold to or from each other is reduced approximately by $\frac{1}{12}$, the number of connection or disconnection of the fittings for transfer is reduced approximately by ½, the number of transfer to be carried out by a hoist is also reduced approximately by ½, and the time required for the assembly or disassembly of the segmented mold is also reduced approximately by ½.

A second embodiment of the segmented mold according to the present invention will be explained below with reference to FIGS. 29 to 35. The segmented mold according to this embodiment is basically the same in structure and function as the previous embodiment, and differs therefrom in the arrangement of the lock pin of the tread mold piece and the latch member of the connector segment. Thus, the following description will be primarily directed to the difference, for avoiding overlapping explanations. For the sake of simplicity, corresponding elements are denoted in the drawings by the essentially the same reference numerals except that they are on the order of 200.

Figure 29:
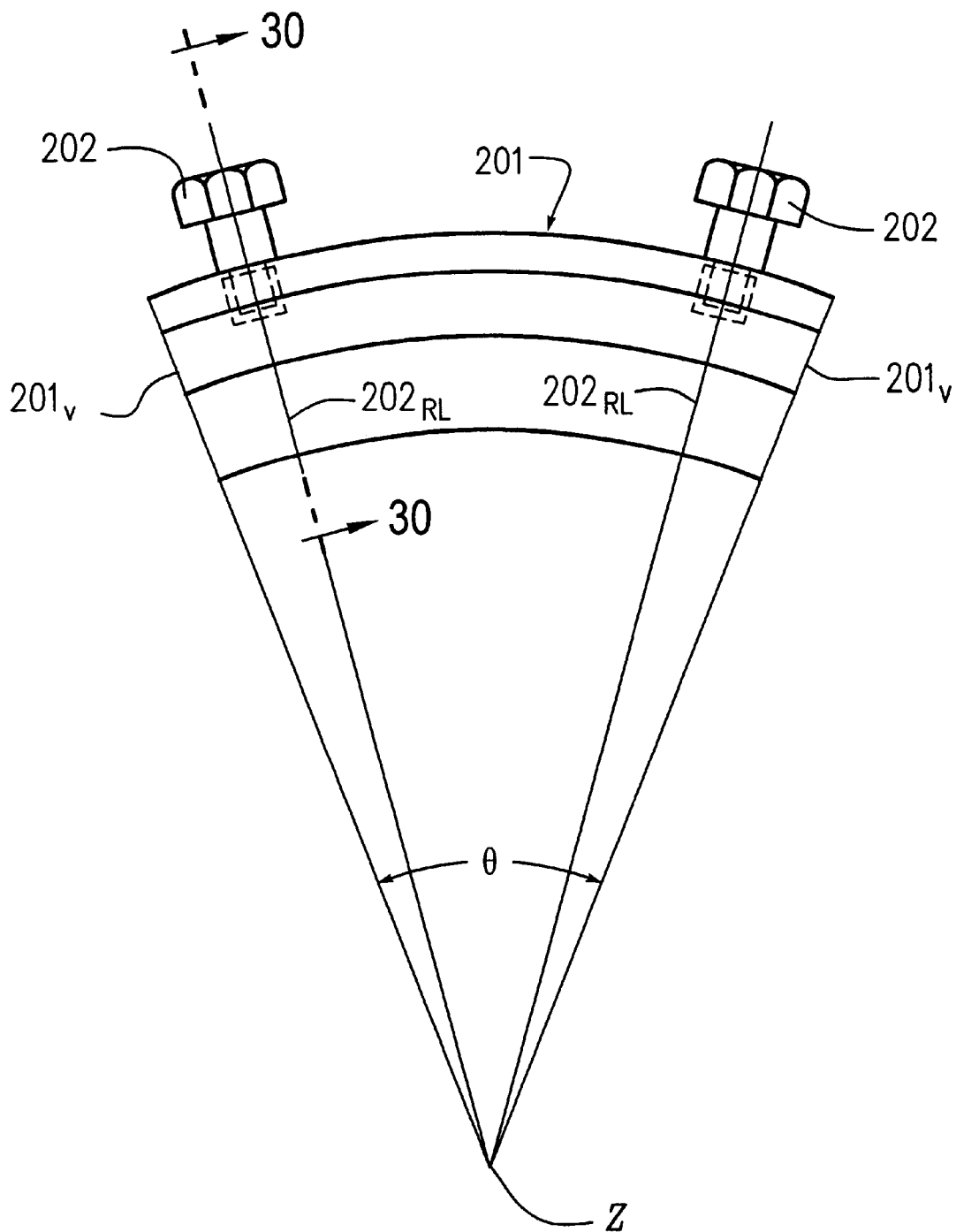
FIG. 29 is a plan view showing a tread mold piece in the segmented mold according to a second embodiment of the present invention.
Figure 30:
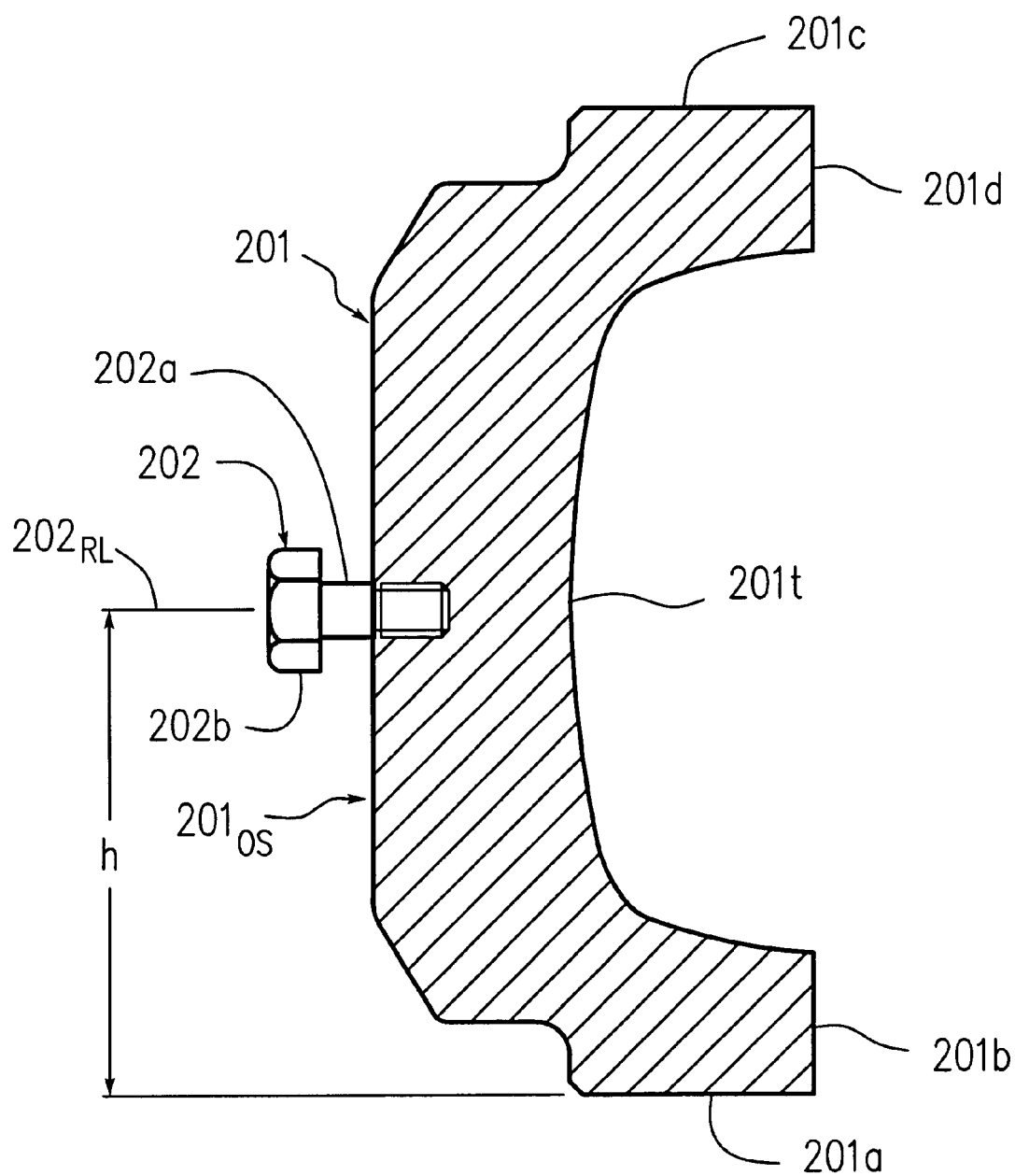
FIG. 30 is a sectional view of the tread mold piece taken along the line 30—30 in FIG. 29.

The segmented mold according to the second embodiment is also comprised of a plurality of tread mold pieces 201, for example nine in number, which are disposed in annular arrangement. As shown in FIGS. 29 and 30, each tread mold piece 201 has an outer peripheral surface 201$_{OS}$ which is provided with two lock pins 202 in the form of bolt. The lock pins 202 are arranged in the regions of the outer peripheral surface 201$_{OS}$ which are close to the circumferential end surfaces 201$v$ of the tread mold piece 201. The lock pin 202 is comprised of a threaded end which is threadedly engaged with the tread mold piece 201, a shank 202$a$ having a cylindrical shape, and a head 202b which is larger in diameter than the shank 202a and which may be of hexagonal cross-section.

Figure 31:
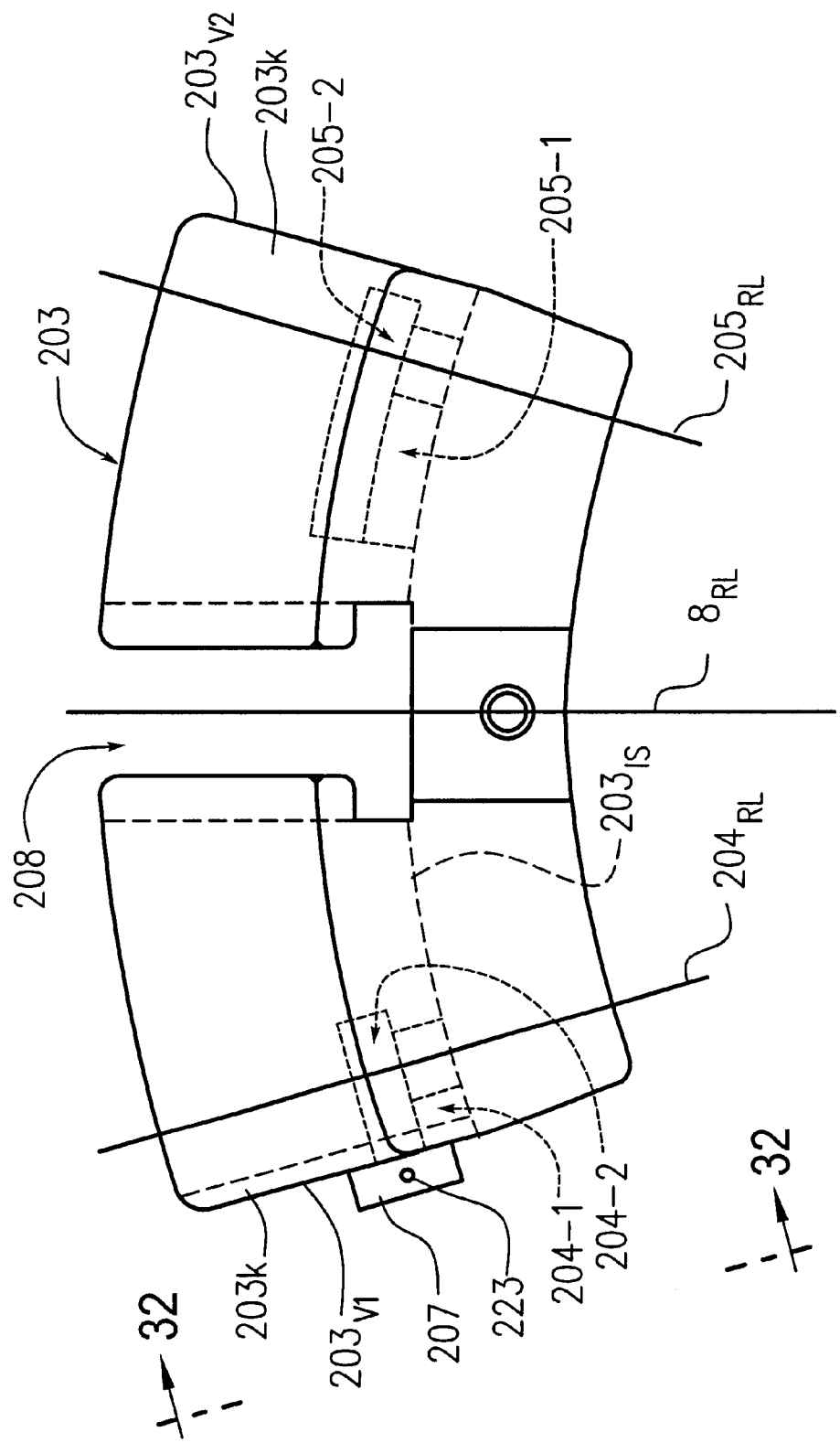
FIG. 31 is a plan view showing a connector segment to be detachably connected to the tread mold piece of FIG. 29.
Figure 32:
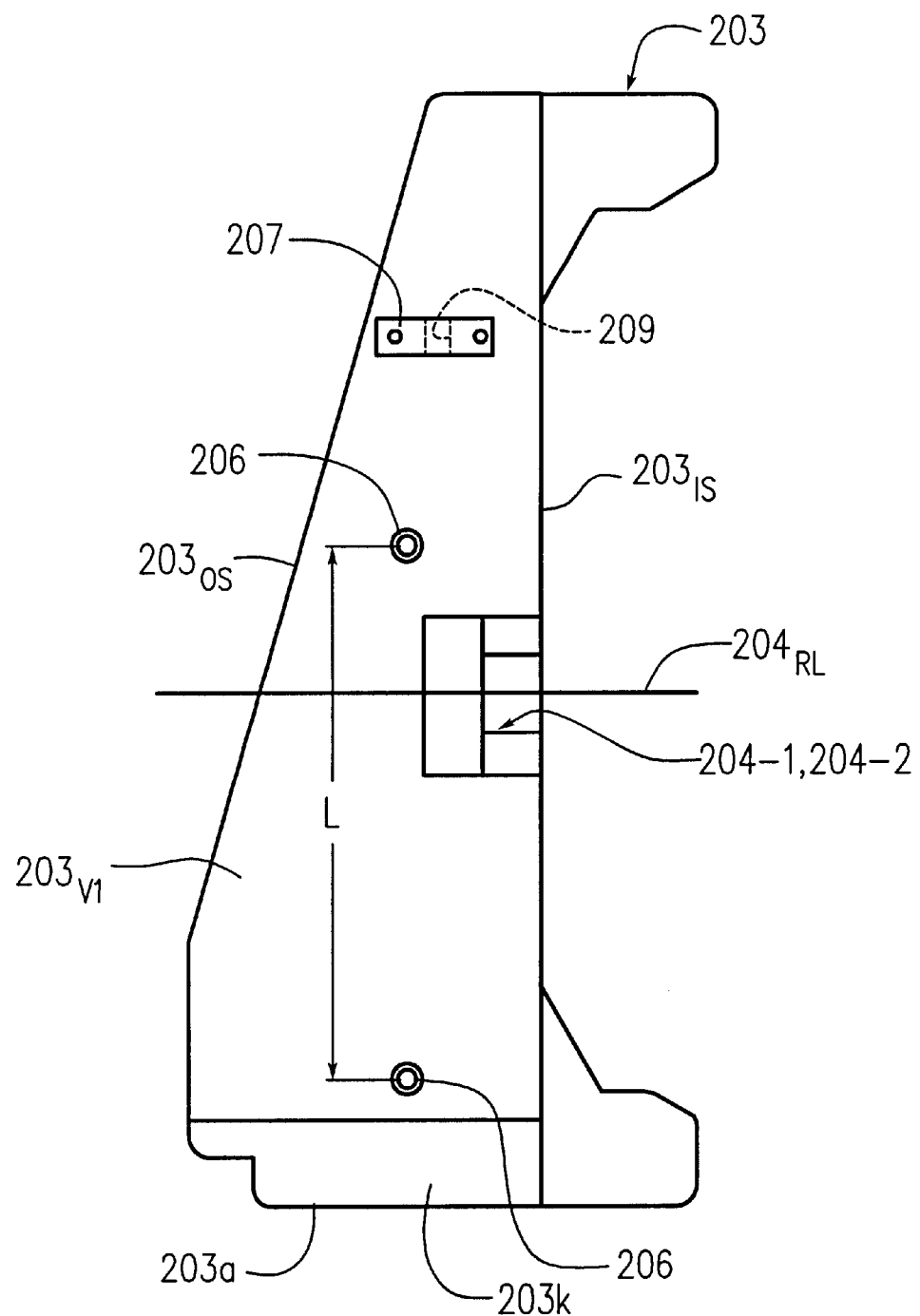
FIG. 32 is a side view of the connector segment as seen in the direction of line 32—32 in FIG. 31.

As shown in FIGS. 31 and 32, interior spaces 204-1 and 205-1 are formed in each connector segment 203, for allowing entry of the corresponding lock pins 202 of the tread mold piece 201. The space 204-1 opens in one circumferential end surface $203v_1$ of the connector segment 203, while the space 205-1 is closed adjacent to the other circumferential end surface $203v_2$ of the connector segment 203. Further interior spaces 204-2 and 205-2 are formed in each connector segment 203, for receiving the corresponding lock pins 202 of the tread mold piece 201. The space 204-2 is in communication with the space 204-1, and the space 205-2 is similarly in communication with the space 205-1, such that these combined spaces allow the movement of the lock pins 202 in the circumferential direction of the mold, relative to the connector segment 203.

The center axes $204_{RL}$ and $205_{RL}$ of the interior spaces 204-2 and 205-2 are aligned with the respective center axes $202_{RL}$ of the lock pins 202, when the connector segment 203 is ready for connection with the tread mold piece 201. The center axes of the interior spaces 204-1 and 205-1, which are not shown, are arranged in the same plane as the center axes $204_{RL}$ and $205_{RL}$ of the interior spaces 204-2 and 205-2.

In view of the entry of the lock pins 202 of the tread mold pieces 201 and angular movement of the lock pins relative to the connector segment 203, as will be described below, it is preferred that the interior spaces 204-1, 204-2, 205-1 and 205-2 are circular in cross-section in a plane which intersects at right angles with the respective axes. In particular, the interior spaces 204-2, 205-2 should have a shape which conforms with the shape of the head 202b and shank 202a of the lock pin 202.

Figure 33:
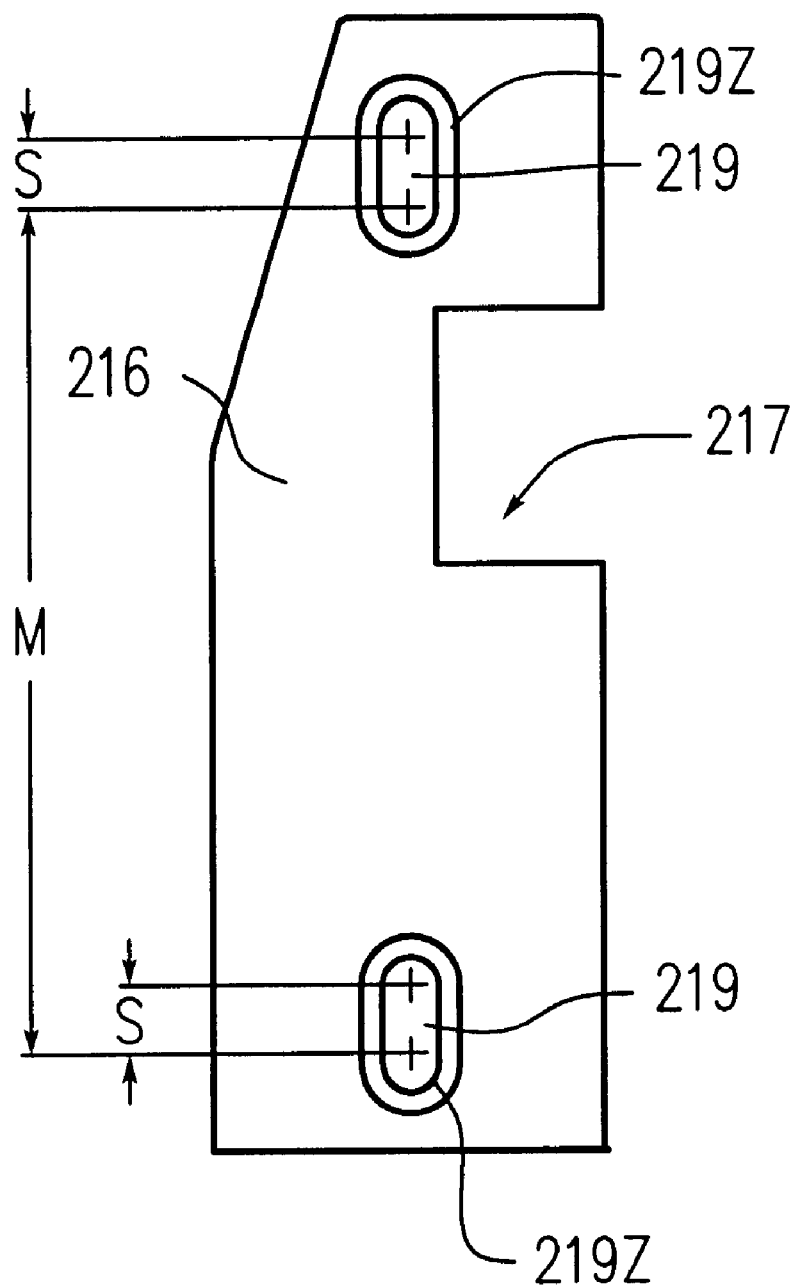
FIG. 33 is a side view of the latch member of the connector segment in the second embodiment of the present invention.
Figure 34:
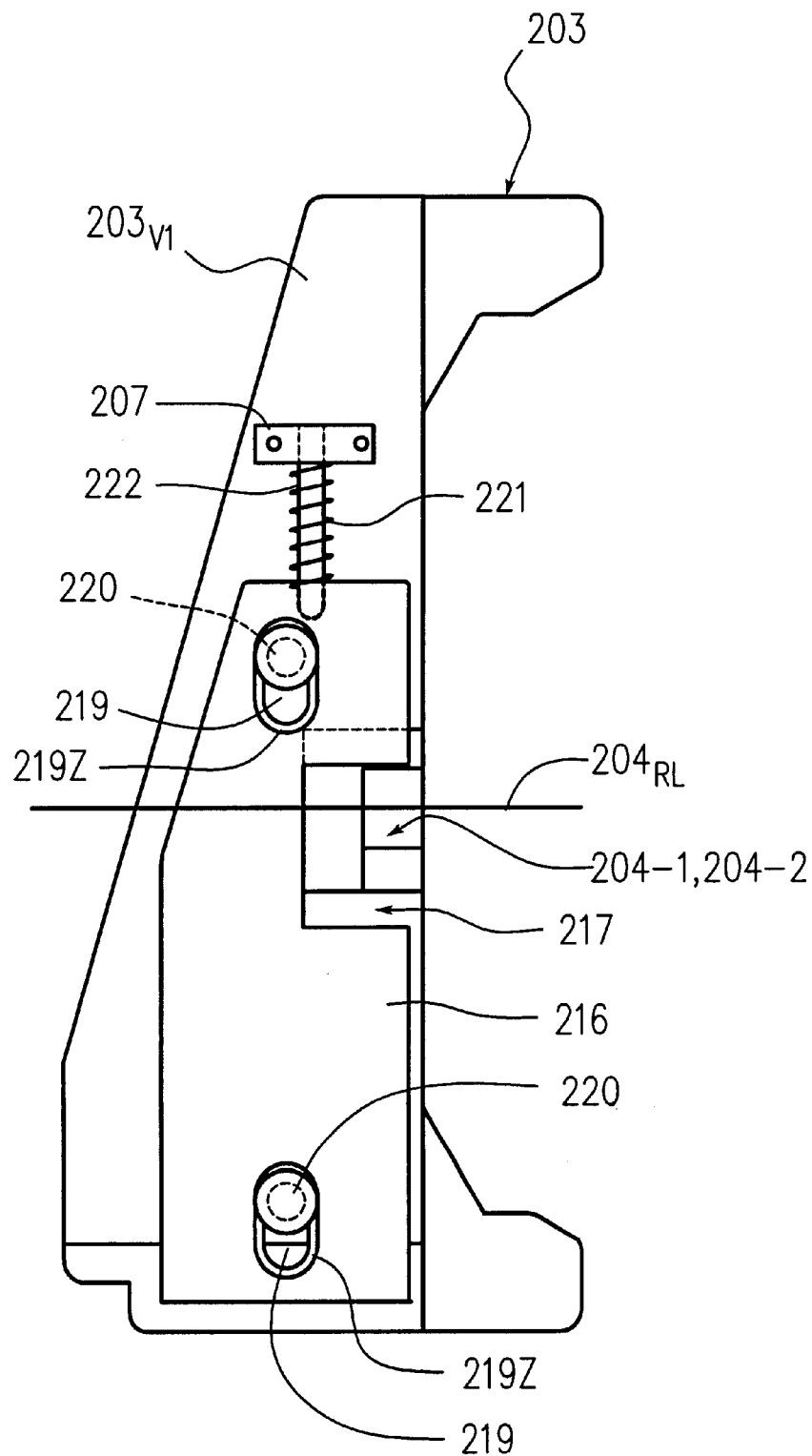
FIG. 34 is a side view similar to FIG. 32, but showing the connector segment which is equipped with the latch member of FIG. 33.

A stopper 216 is shown in FIG. 33, which is secured to the connector segment 203 at its circumferential end surface $203v$, in the region where the interior space 204-1 opens, as shown in FIG. 34. The stopper 216 is similar to the vertical plate 116 of the latch member 115 in the previous embodiment, in that the stopper 216 is vertically movable and engaged y a compression spring 221. The stopper 216 has a window 217 which is aligned with the opening of the interior space 204-1. The window 217 has a height and a depth which correspond to the opening height and the depth of the interior space 204-1. It is noted that the depth of the window 217 or the space 204-1 is measured in the radial direction of the mold. The stopper secured to the connector segment 203 normally assumes a lowermost position as shown in FIG. 34, in which the stopper 216 at least partly closes the opening of the interior space 204-1. The vertical stroke of the stopper 216 is determined such that, upon entry of the lock pin 202, the window 217 is in exact alignment with the opening of the interior apace 204-1.

Figure 35:
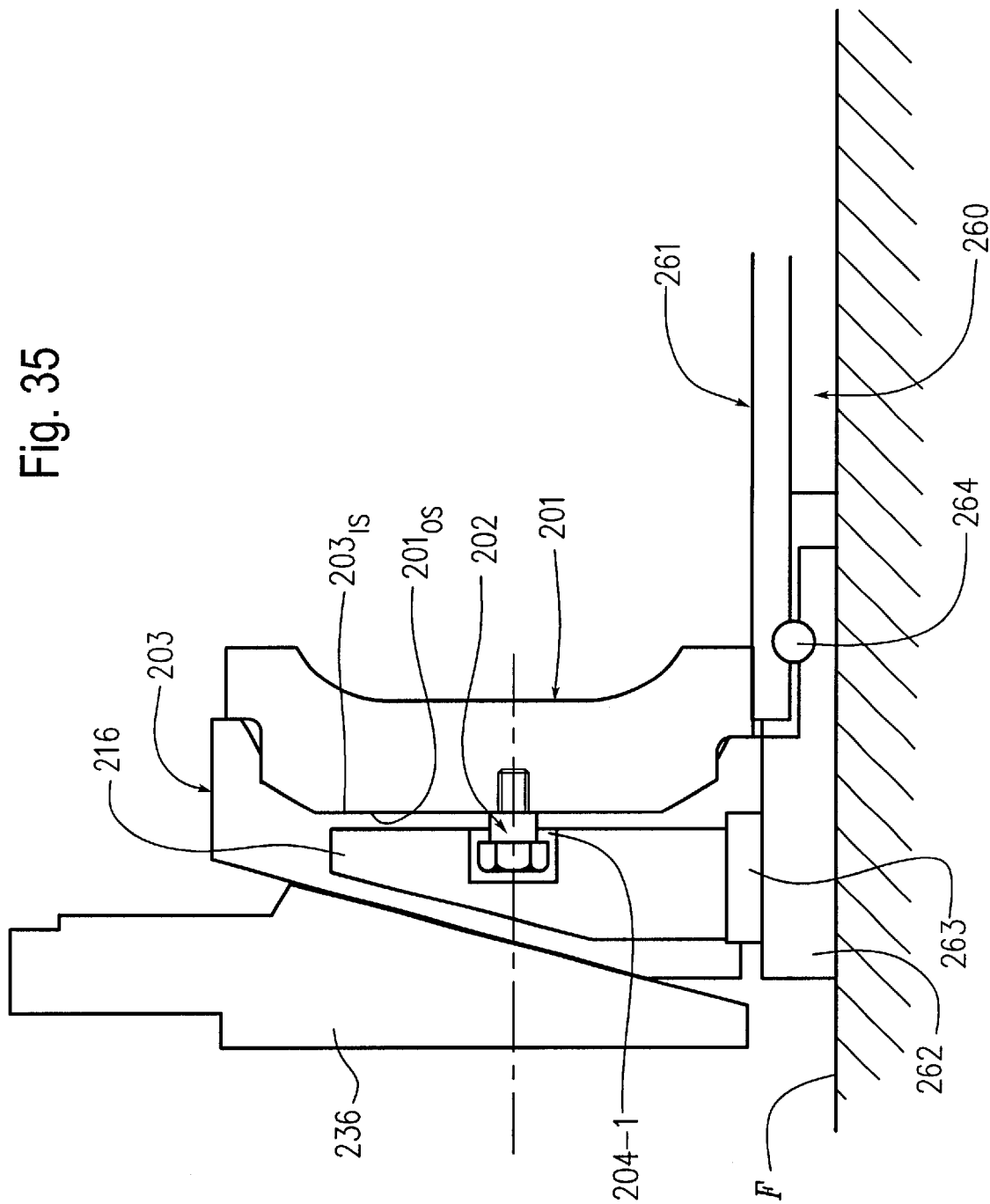
FIG. 35 is a left-half sectional view of the segmented mold according to the second embodiment, in which the tread mold piece and the connector segment have been connected to each other.
Figure 36:
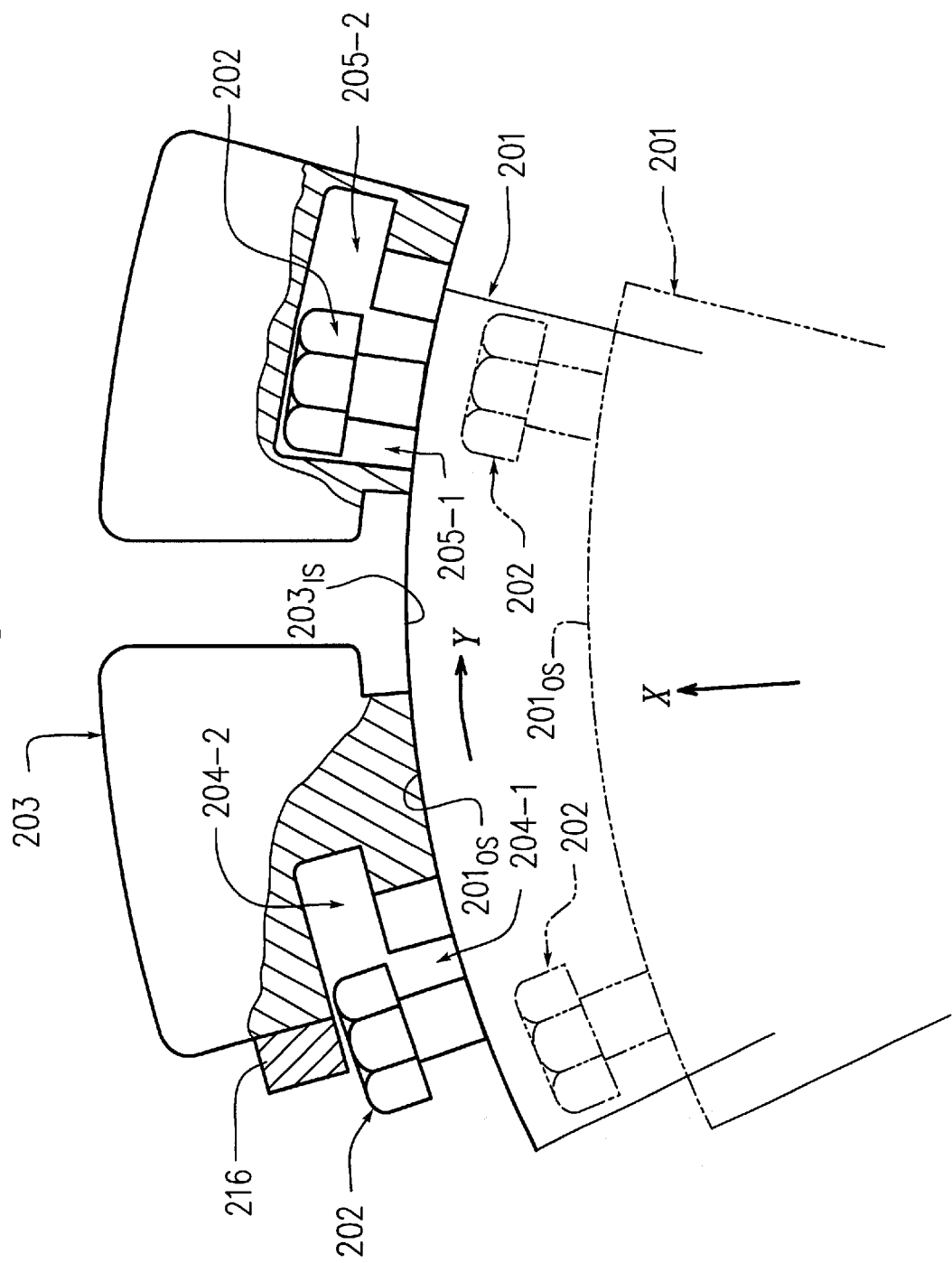
FIG. 36 is a plan view showing the relative movement of the tread mold piece and the connector segment before they are connected to each other.
Figure 37:
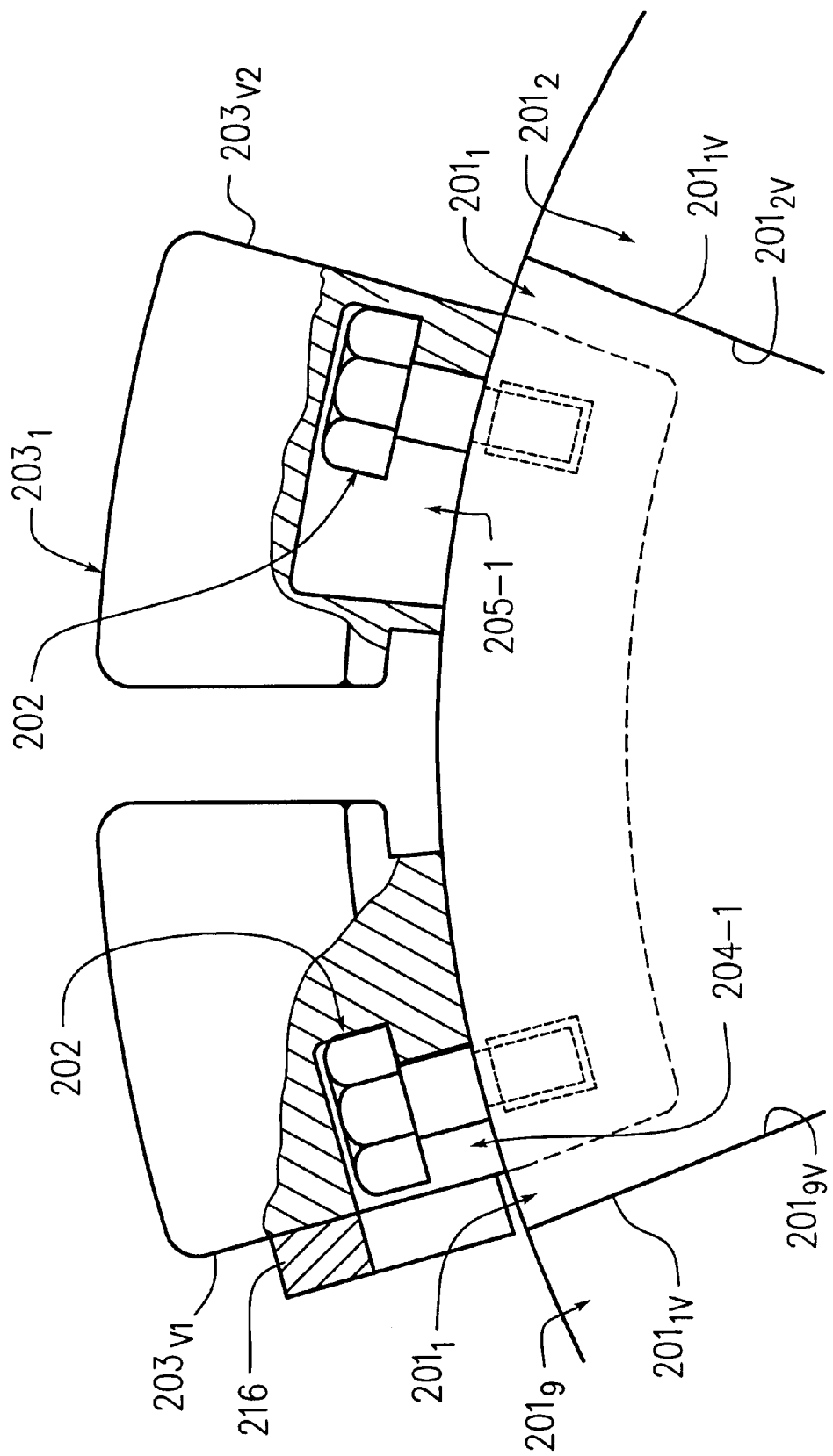
FIG. 37 is a plan view similar to FIG. 36, but showing the tread mold piece and the connector segment after they have been connected to each other.
Figure 38:
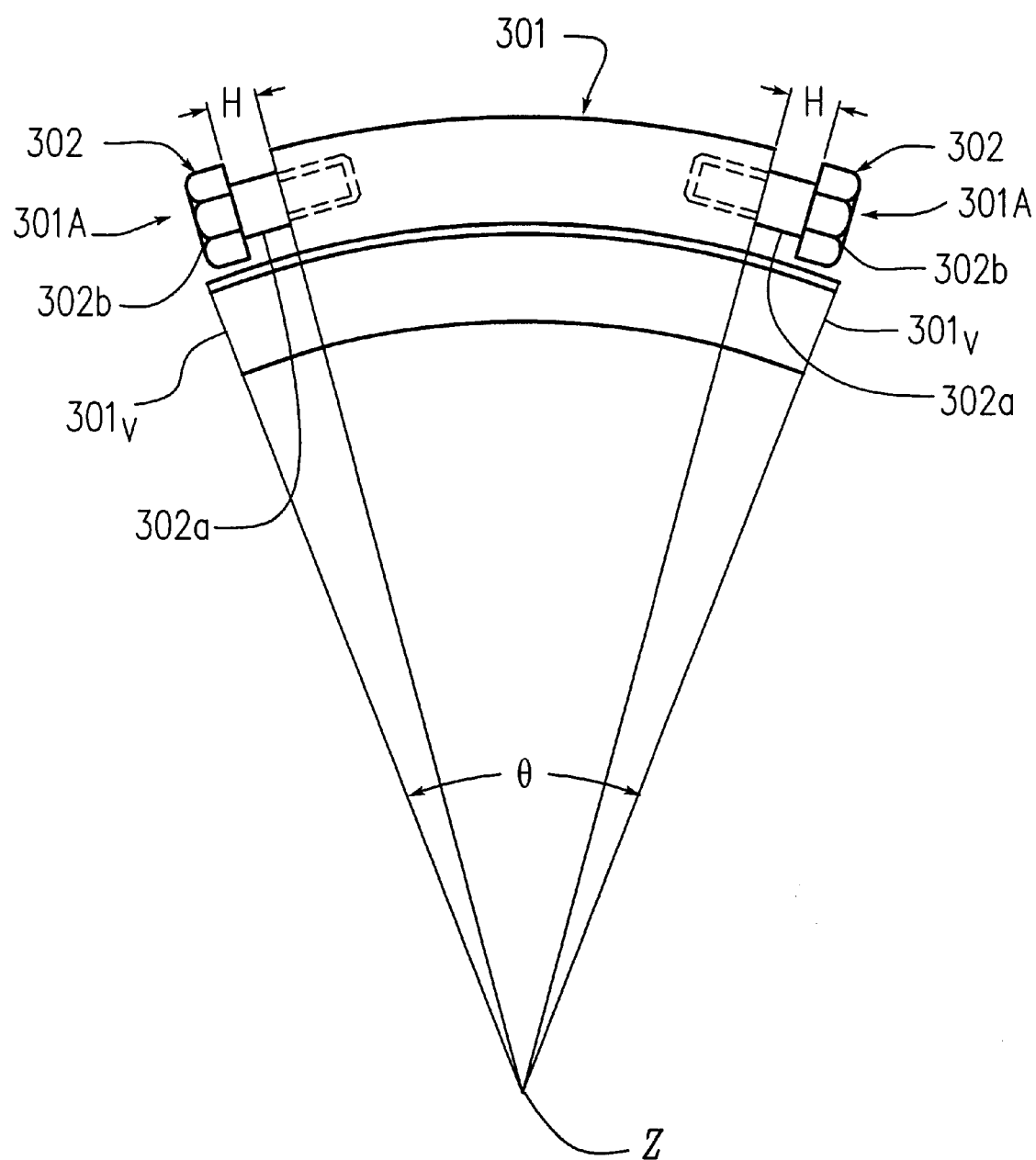
FIG. 38 is a plan view showing a tread mold piece in the segmented mold according to a third embodiment of the present invention.
Figure 39:
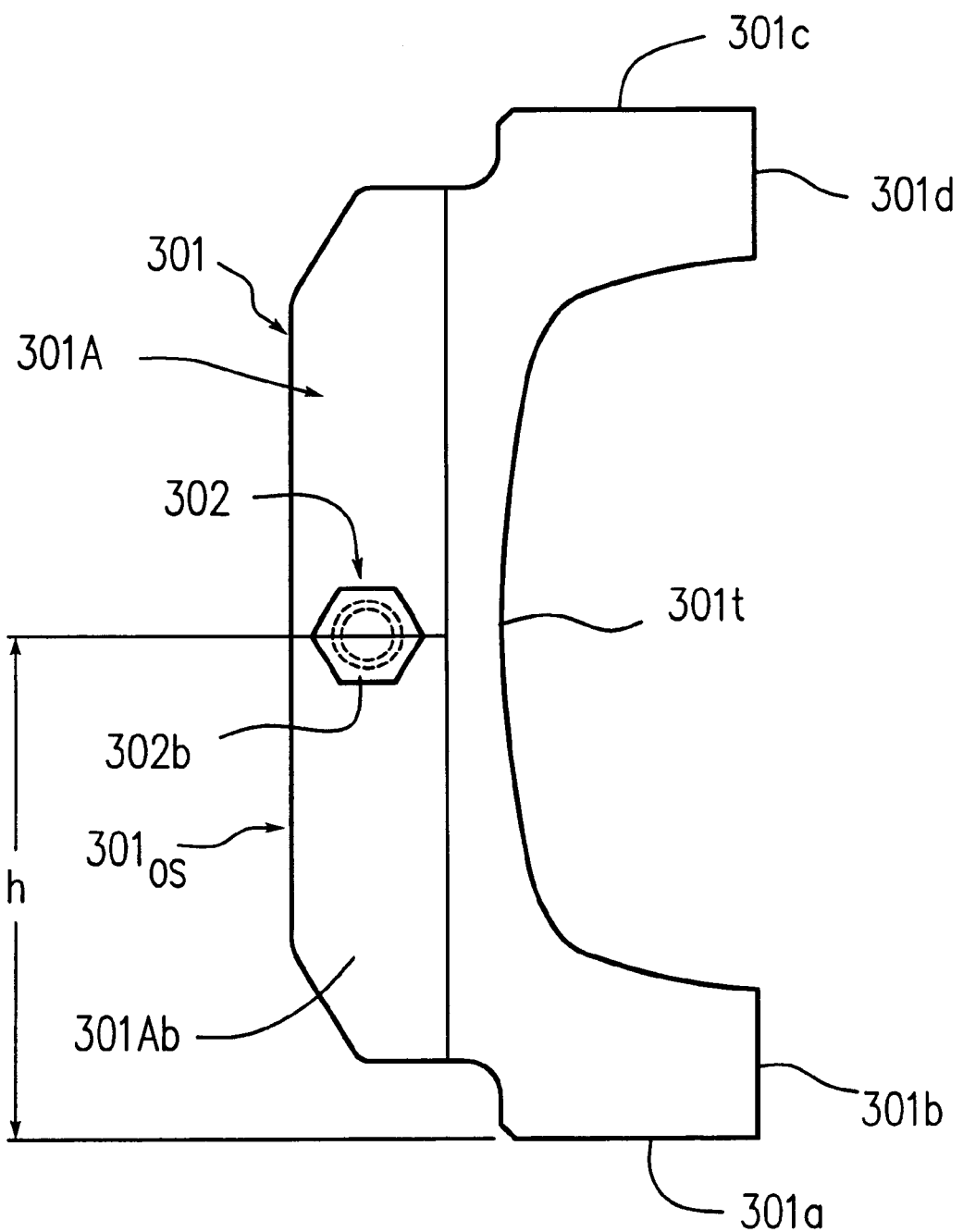
FIG. 39 is a side view of the tread mold piece shown in FIG. 38.

With reference to FIGS. 35 to 37, the manner of achieving the locking engagement of the connector segment 203 with the tread mold piece 201 will be described below.

FIG. 35 shows that the container ring 236 has been moved downwards to its lowermost position so that each connector segment 203 assumes the radially innermost position where the inner peripheral surface $203_{IS}$ of the connector segment 203 is in contact with the outer peripheral surface $201_{OS}$ of the corresponding tread mold piece 201. During such movement of the connector segment 203 toward the tread mold piece 201, one of the lock pins 202 of the tread mold piece 201 enters into the corresponding interior space 205-1 which is shown on the right side in FIG. 36.

As further shown in FIG. 35, the tread mold pieces 201 are mounted on a rotary table 261 which is rotatably supported on a base member 260, while the connector segments are placed on a stationary table 262. The stationary table is provided with nine projection members 263 which are similar to the projection members 147 in the previous embodiment Thus, each projection member 263 is situated between opposite circumferential end surfaces of the neighboring connector segments 203, to cause an upward movement of the corresponding stopper 216. The window 217 of the stopper 216 which has been moved upwards is aligned with the opening of the interior space 204-1, so as to allow entry of the lock pin into the interior space 204-1.

The rotary table 261 is also supported a number of steel balls 264 on the stationary table 262 such that it can be smoothly rotated. The rotary table 261 is rotated so as to cause movement of the tread mold pieces 201 relative to the respective connector segments 203, as shown by arrow Y in FIG. 36, until both lock pins 202 of the tread mold piece 201 are completely accommodated in the respective interior spaces 204-2, 205-2. At this instance, the locking engagement of the connector segment 203 with the tread mold piece 201 is achieved, as shown in FIG. 37.

When the container ring 236 is subsequently moved upwards, the stopper 216 is released from the projection member 263 and moved downwards relative to the connector segment 203, under the biasing force of the compression spring 221, thereby closing the opening of the interior space 204-1 in the circumferential end surface $203v$ of the connector segment 203 (FIG. 34). The locking engagement of the connector segment 203 with the tread mold piece 201 is now completed, and the undesirable disengaged f the lock pins 202 from the connector segment 203 is prevented by the stopper 216.

The second embodiment of the present invention is featured by the locking engagement of the connector segment 203 with the tread mold piece 201, which is achieved by bayonet-like engagement between a pair of lock pins 202 of the tread mold piece 201 and the uniquely configured interior spaces 204-1, 204-2, 205-1 and 205-2 in the connector segment 203. The segmented mold according to the second embodiment achieves essentially the same functional advantages as the first embodiment.

A third embodiment of the segmented mold according to the present invention will be explained below with reference to FIGS. 38 to 42. The segmented mold according to this embodiment is basically the same in structure and function as the previous embodiments, and differs therefrom in the arrangement of the lock pin of the tread mold piece and the latch member of the connector segment. Thus, the following description will be primarily directed to the difference, for avoiding overlapping explanations. For the sake of simplicity, corresponding elements are denoted in the drawings by the essentially the same reference numerals except that they are on the order of 300.

The segmented mold according to the third embodiment is also comprised of a plurality of tread mold pieces 301, for example nine in number, each having cutouts 301A at the outer peripheral surface and the circumferential end surfaces 301v of the tread mold piece 301. Each cutout 301A has a circumferential end surface 301Ab which coincides with a radial plane including the mold center axis Z and which is perpendicular to the bottom surface 301a of the tread mold piece 301.

Each tread mold piece 301 is provided with a pair of lock pins 302 in the form of bolts which are arranged in respective the cutouts 301A so as to project in the circumferential direction from the end surfaces 301A*b* of the cutout 301A. The lock pin 302 is comprised of a threaded end which is threadedly engaged with the tread mold piece 301, a shank 302*a* having a cylindrical shape, and a head 302*b* which is larger in diameter than the shank 302*a* and which may be of hexagonal cross-section. The head 302*b* of the lock pin 302 is spaced from the end surface 301A*b* of the cutout 301A by a predetermined distance H. The head 302*b* of the lock pin 302 should be accommodated without projecting from the cutout 301A of the tread mold piece 301.

Figure 40:
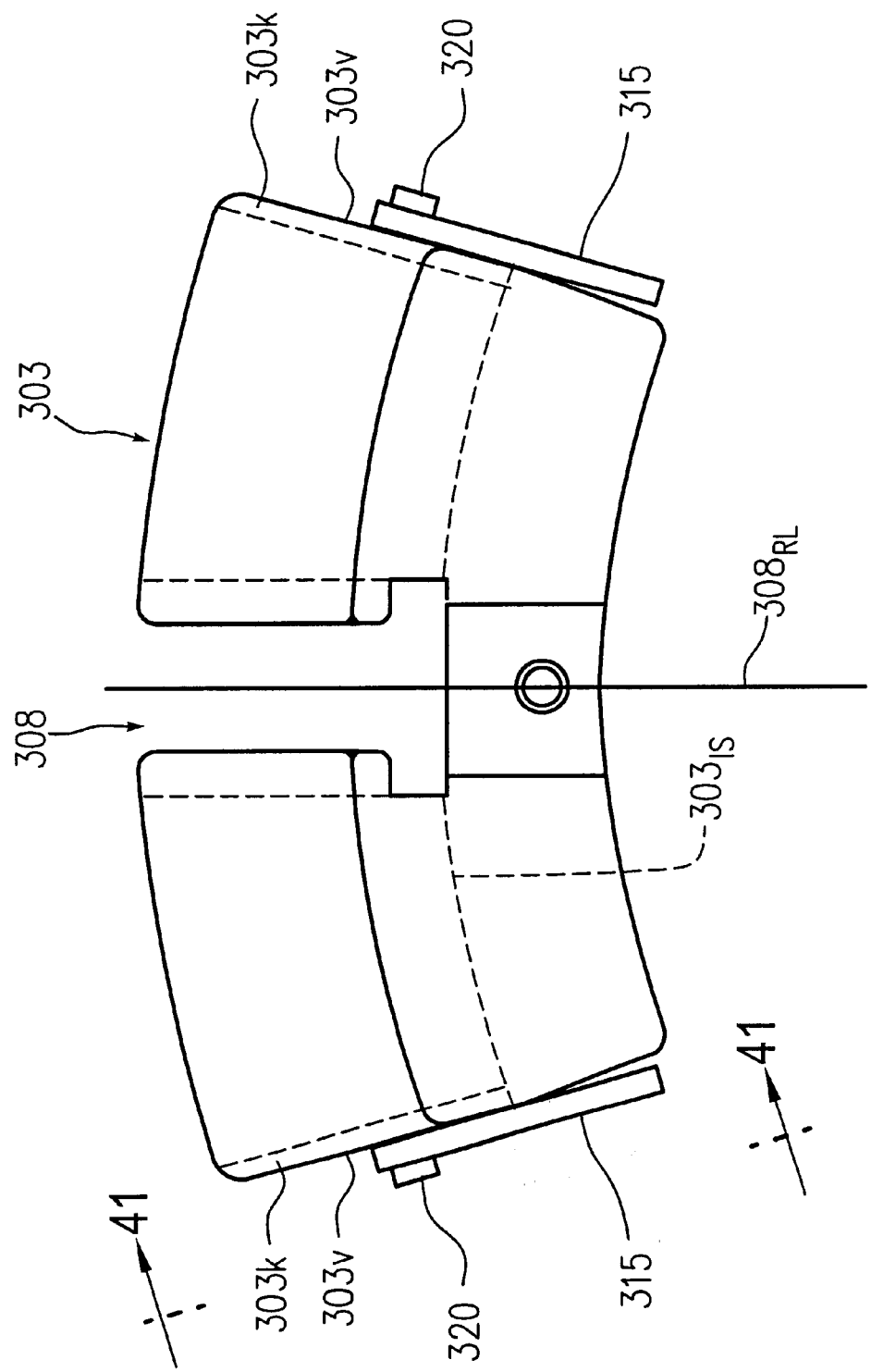
FIG. 40 is a plan view showing a connector segment to be detachably connected to the tread mold piece of FIG. 38.
Figure 41:
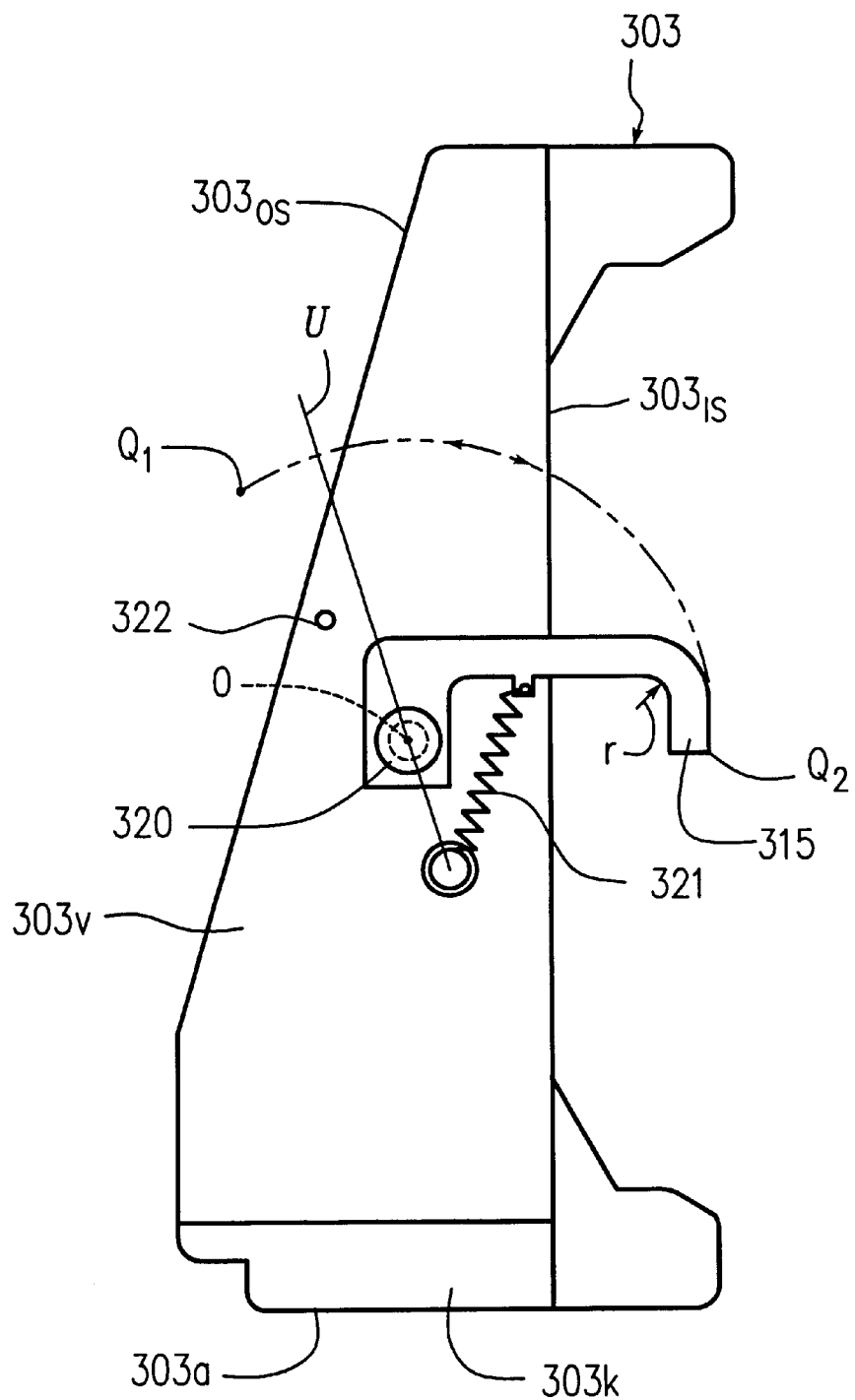
FIG. 41 is a side view of the connector segment as seen in the direction of line 41—41 in FIG. 40.

As shown in FIGS. 40 and 41, the connector segment 303 is provided with a pair of swing arms 315 on opposite circumferential end surfaces 301*v* thereof. The swing arm 315 is rotatably supported by a pin 320 which is fixedly secured to the corresponding circumferential end surface 301*v* of the connector segment 301. The center axis O of the pin 320 forms the center of the swing motion of the arm 315. The inner end of the swing arm 315 is movable between an outer end position $Q_1$ and an inner end position $Q_2$, along an arcuate path which is indicated by an imaginary line in FIG. 41. It is preferred that the radius of curvature "r" of the swing arm 315 at its inner end is substantially the same as the radius of the shank 302*a* of the lock pin 302. It is to be ensured that, when the inner end of the swing arm 315 is at the inner end position $Q_2$, the lower surface of the swing arm 315 is situated adjacent to the outer surface of the shank 302*a* of the lock pin 302.

A tension spring 321 is arranged between appropriate position of the swing arm 315 and an anchor point on the circumferential end surface 303*v* of the connector segment 303, which is situated on the radially inner side of the center axis O of the pin 320. The outer end position $Q_1$ of the swing arm 315 is situated on radially outer side of a straight line "u" which passes the center axis O of the pin 320 and the anchor point for the lower end of the spring 321. Thus, the spring 321 functions as an over-center spring. If necessary, stoppers 322 may be provided on the circumferential surface 303*v* of the connector segment 303, for defining the outer and inner end positions $Q_1$, $Q_2$ of the swing arm 315.

Figure 42:
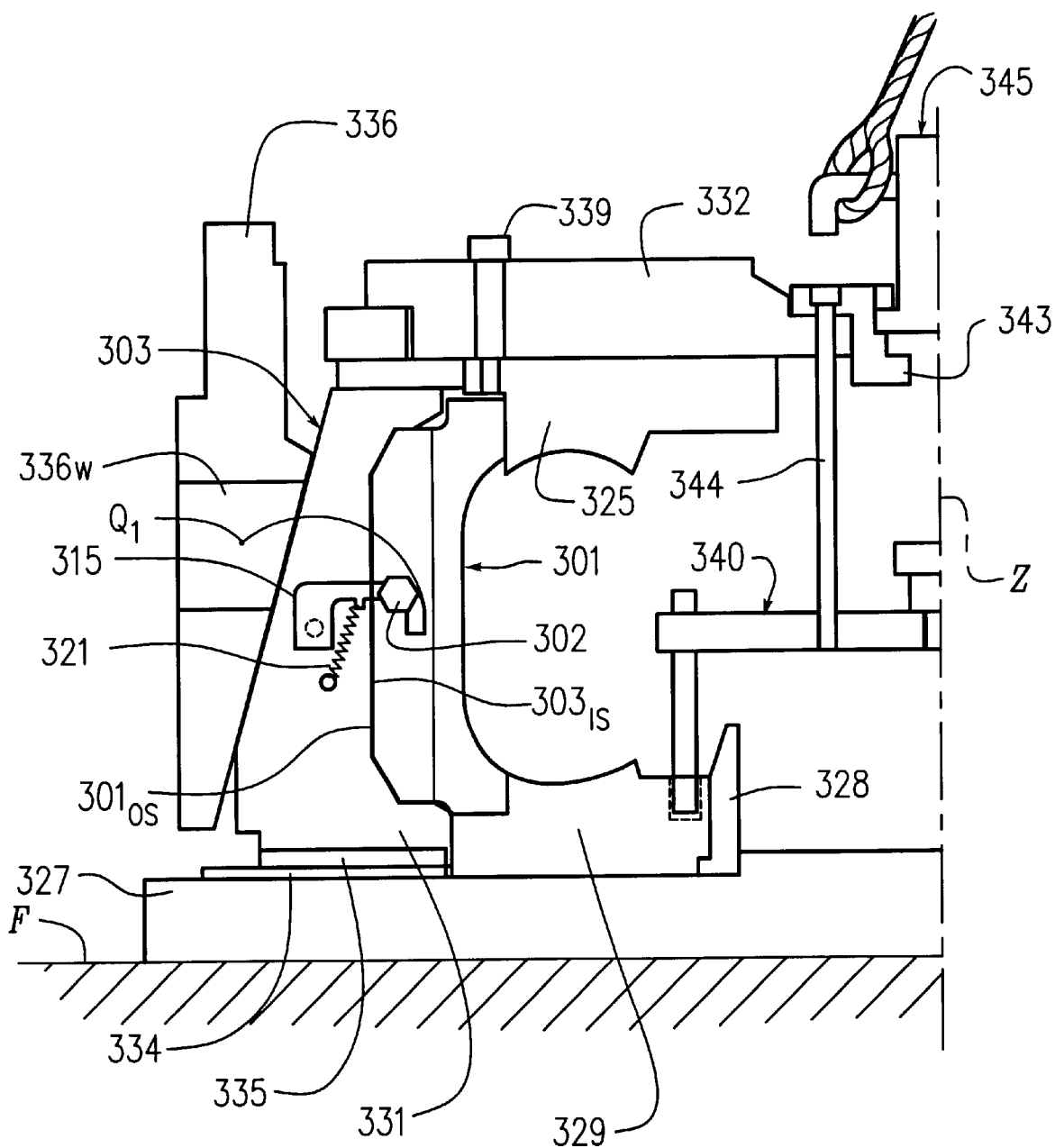
FIG. 42 is a left-half sectional view showing the segmented mold according to the third embodiment, in which all the components have been assembled.

As shown in FIG. 42, the tread mold pieces 301 are disposed in annular arrangement between the lower side mold member 329 and the upper side mold member 332. The container ring 336 carrying the connector segments 303 is moved downwards such that the connector segments 303 are brought into contact with the respective tread mold pieces 301. Subsequently, the swing am 315 is moved inwards from the outer end position $Q_1$ toward the inner end position $Q_2$. In this instance, with the aid of appropriate tool such as a T-shaped push rod, the swing arm 315 is manually pushed inwards. As soon as the swing arm 315 is pushed beyond the straight line "u", the tension of the spring 321 under an over-center function causes the swing arm 315 to automatically reach the inner end position $Q_2$, where the inner end of the swing arm 315 is brought into engagement with the shank 302*a* of the lock pin 302. To this end, the thickness of the swing arm 315 at its inner end is smaller than the height H of the head 302*b* of the lock pin 302.

For allowing the manual operation of the swing arm 315 as above, it is assumed that the opposite circumferential end surfaces 303*v* of the neighboring connector segments 303 are spaced from each other by appropriate distance which may be on the order of 10–20 mm, for example. Also, the container ring 336 is formed with windows 336*w* at locations corresponding to the swing arms 315, so that the swing arms 315 are accessible from radially outer side of the container ring 336.

When the inner end of each swing arms 315 is in engagement with the shank 302*a* of the corresponding lock pin 302, the connector segment 303 is in locking engagement with the tread mold piece 301. Finally, the top plate 332 is fixedly secured to the upper side mold member 325, to complete the assembly of the segmented mold. The connector segment 303 can be disengaged from the tread mold piece 301 in essentially opposite sequence, by using a tool and manually moving the swing arm 315 from the inner end position $Q_2$ to the outer end position $Q_1$.

The assembly of the segmented mold according to the third embodiment can be carried out either as an external arrangement or an internal arrangement. The segmented mold according to the third embodiment is relatively simple and less costly in structure, and achieves essentially the same functional advantages as the previous embodiments.

It can be appreciated from the foregoing detailed description that the present invention provides an improved segmented mold which can be assembled or disassembled within a significantly reduced time, making it possible to perform the changeover in size of the tires to be produced by the vulcanizing machine and thereby achieving a marked improvement in the manufacturing productivity. Moreover, with the segmented mold according to the present invention, the components of the mold are positioned and centered with respect to each other in a positive and facilitated manner, so as to allow production of high quality tires in terms of dimensional accuracy.

While the present invention has been described above with respect to specific embodiments, they have been presented by way of examples only, and various changes or alterations may be made without departing from the scope of the invention as defined by the appended claims.

What is claimed is:

1. A segmented mold for pneumatic tires, comprising:

a plurality of segmented tread mold pieces for forming an outer contour of a tire tread portion, said tread mold pieces each having an outer peripheral surface and circumferential end surfaces;

a plurality of connector segments detachably connected to said outer peripheral surface of the respective tread mold pieces, said connector segments each having a tapered portion on back side thereof;

a container ring having a tapered surface that is slidably engaged with said tapered portions of the connector segments such that an axial movement of the container ring causes a radial movement of said tread mold pieces;

means for detachably connecting said connector segments to the respective tread mold pieces, including first latch means and second latch means provided for said connector segments and said tread mold pieces, respectively; and actuating means for moving said first and said second latch means relative to each other so that said first and second latch means are engaged with each other upon relative movement of the first and second latch means in a predetermined direction thereby connecting said connector segments to said tread mold pieces, and said first and second latch means are disengaged from each other upon movement of the first and second latch means in an opposite direction thereby disconnecting said connector segments from said tread mold pieces, wherein said first latch means comprises at least one lock pin that projects from said tread mold piece so as to be engageable with said second latch means.

2. The segmented mold according to claim 1, wherein said lock pin comprises a shank which is situated adjacent to said tread mold piece, and a head which is larger in diameter than said shank and situated on outer side of the shank.

3. The segmented mold according to claim 2, wherein said lock pin further comprises a guide portion situated on outer side of the head and having a diameter which diminishes toward a free end of the lock pin.

4. The segmented mold according to claim 1, wherein said lock pin is arranged adjacent to said circumferential end surface of the tread mold piece so as to project radially outwards from said outer peripheral surface of the tread mold piece.

5. The segmented mold according to claim 1, wherein said circumferential end surface of the tread mold piece has a recess which is accessible from radially outer side, and said lock pin is arranged in said recess to project from the tread mold piece in circumferential direction of the mold.

6. The segmented mold according to claim 1, wherein said second latch means comprises at least one latch member which is engageable with said at least one lock pin.

7. The segmented mold according to claim 6, wherein said connector segment has a first space and a second space, said first space is adapted to receive said lock pin, said lock pin comprising a shank, said latch member is radially movable relative to said connector segment and has an arm which is accommodated in said second space so as to be engageable with said shank of the lock pin.

8. The segmented mold according to claim 7, further comprising resilient means for biasing said arm in a direction in which it is engaged with said lock pin.

9. The segmented mold according to claim 1, herein said connector segments each has at least one interior space which is so configured as to establish a bayonet connection with said lock pin by advancing said lock pin into said interior space in the radial direction of the mold and subsequently causing an angular motion of said tread mold piece relative to said connector segment about the center axis of the mold.

10. The segmented mold according to claim 9, comprising a stationary table for supporting said connector segments, and a rotary table for supporting said tread mold pieces and causing said angular motion of the tread mold pieces relative to said connector segments.

11. The segmented mold according to claim 2, wherein said lock pins each projects from the circumferential end surface of said tread mold piece so as to be engageable with said second latch means.

12. The segmented mold according to claim 11, wherein said second latch means comprises a swing arm rotatably carried by the circumferential end surface of said connector segment so as to be movable between an outer end position in which it is disengaged from said lock pin, and an inner end position in which it is engaged with said lock pin.

13. The segmented mold according to claim 12, further comprising an over-center spring means which cooperates with said swing arm so that said first and second end positions are bistable positions of the swing arm.

* * * * *